United States Patent
McNicoll et al.

(10) Patent No.: US 12,172,905 B2
(45) Date of Patent: Dec. 24, 2024

(54) METHODS OF EXTRACTION OF PRODUCTS FROM TITANIUM-BEARING MATERIALS

(71) Applicant: AVERTANA LIMITED, Auckland (NZ)

(72) Inventors: Campbell Stuart McNicoll, Parnell (NZ); Mohammed Shereez Ali, Parnell (NZ); Jason Trevor Herrold, Parnell (NZ); David Jonathan Hassell, Parnell (NZ)

(73) Assignee: AVERTANA LIMITED, Auckland (NZ)

( * ) Notice: Subject to any disclaimer, the term of this patent is extended or adjusted under 35 U.S.C. 154(b) by 576 days.

(21) Appl. No.: 17/312,938

(22) PCT Filed: Dec. 16, 2019

(86) PCT No.: PCT/NZ2019/050159
§ 371 (c)(1),
(2) Date: Jun. 11, 2021

(87) PCT Pub. No.: WO2020/122740
PCT Pub. Date: Jun. 18, 2020

(65) Prior Publication Data
US 2022/0127159 A1   Apr. 28, 2022

(30) Foreign Application Priority Data
Dec. 14, 2018 (NZ) .......... 749209

(51) Int. Cl.
C01G 23/053 (2006.01)
C01F 5/40 (2006.01)
(Continued)

(52) U.S. Cl.
CPC ............ *C01G 23/0534* (2013.01); *C01F 5/40* (2013.01); *C01F 7/74* (2013.01); *C01F 11/46* (2013.01); *C01G 23/08* (2013.01); *C01P 2002/34* (2013.01)

(58) Field of Classification Search
None
See application file for complete search history.

(56) References Cited

U.S. PATENT DOCUMENTS 1,793,501 A   2/1931   Lubowsky
2,098,025 A   11/1937  Booge et al.
(Continued)

FOREIGN PATENT DOCUMENTS

AU   781370      5/2005
AU   2010280425  2/2012
(Continued)

OTHER PUBLICATIONS

Trees, W. E., et al. "Neutralization of Sulfate Process Titanium Dioxide Wastes with Limestone and Lime." Journal (Water Pollution Control Federation), vol. 51, No. 1 (Jan., 1979), pp. 158-162. (Year: 1979).*

(Continued)

*Primary Examiner* — Anthony J Zimmer
*Assistant Examiner* — Syed T Iqbal
(74) *Attorney, Agent, or Firm* — JMB Davis Ben-David

(57) ABSTRACT

The invention relates to processes for the extraction of products from titanium-bearing materials or a composition produced in a process for the production of titanium dioxide, and more particularly, although not exclusively, extracting titanium dioxide and/or one or more other products from iron making slag.

24 Claims, 3 Drawing Sheets

(51) Int. Cl.
- *C01F 7/74* (2022.01)
- *C01F 11/46* (2006.01)
- *C01G 23/08* (2006.01)

(56) References Cited

U.S. PATENT DOCUMENTS

| | | |
|---|---|---|
| 2,098,026 A | 11/1937 | Booge et al. |
| 2,098,054 A | 11/1937 | McBerty |
| 2,557,528 A | 6/1951 | Andrews |
| 2,774,650 A | 12/1956 | Oppegaard |
| 2,830,892 A | 4/1958 | Udy |
| 3,056,689 A | 10/1962 | Derek et al. |
| 3,071,435 A | 1/1963 | Knudsen |
| 4,006,080 A | 2/1977 | Twist et al. |
| 4,288,418 A | 9/1981 | Davis et al. |
| 4,552,730 A | 11/1985 | Shirts et al. |
| 4,562,049 A | 12/1985 | Shirts et al. |
| 4,663,131 A | 5/1987 | Gerken et al. |
| 5,277,816 A | 1/1994 | Watanabe |
| 6,048,505 A | 4/2000 | Miller et al. |
| 6,090,354 A | 7/2000 | Russell et al. |
| 6,248,302 B1 | 6/2001 | Barnett et al. |
| 6,375,923 B1 | 4/2002 | Duyvesteyn et al. |
| 6,440,383 B1 | 8/2002 | Duyvesteyn et al. |
| 6,447,738 B1 | 9/2002 | Rendall et al. |
| 6,548,039 B1 | 4/2003 | Duyvesteyn |
| 6,713,038 B2 | 3/2004 | Zhou et al. |
| 7,258,847 B2 | 8/2007 | Becker et al. |
| 7,462,337 B2 | 12/2008 | Becker et al. |
| 7,625,536 B2 | 12/2009 | Smith, Jr. et al. |
| 7,771,679 B2 | 8/2010 | Jha et al. |
| 7,964,164 B2 | 6/2011 | Cooke et al. |
| 8,017,021 B1 | 9/2011 | Staples |
| 8,021,634 B2 | 9/2011 | Roche et al. |
| 8,728,437 B2 | 5/2014 | Stuart et al. |
| 8,834,600 B2 | 9/2014 | Jha et al. |
| 9,073,797 B2 | 7/2015 | Demosthenous et al. |
| 9,458,522 B2 | 10/2016 | Manson |
| 10,287,176 B2 | 5/2019 | Hassell et al. |
| 10,294,117 B2 * | 5/2019 | Hassell ............... C22B 34/1259 |
| 10,407,316 B2 | 9/2019 | Hassell et al. |
| 2004/0136899 A1 | 7/2004 | Bekker et al. |
| 2006/0153768 A1 | 7/2006 | Roche et al. |
| 2008/0124259 A1 | 5/2008 | Roche et al. |
| 2008/0124262 A1 | 5/2008 | Roche et al. |
| 2009/0311153 A1 | 12/2009 | Roche et al. |
| 2015/0176103 A1 | 6/2015 | Fang et al. |
| 2015/0299820 A1 | 10/2015 | Manson |
| 2017/0022069 A1 | 1/2017 | Manson |
| 2017/0158523 A1 * | 6/2017 | Hassell ................... C01F 7/74 |
| 2017/0355612 A1 | 12/2017 | Krempels |
| 2019/0070598 A1 | 3/2019 | Manson |

FOREIGN PATENT DOCUMENTS

| | | | |
|---|---|---|---|
| CA | 2363031 | 8/2000 | |
| CN | 86108511 | 6/1988 | |
| CN | 1006635 | 1/1990 | |
| CN | 1729304 | 2/2006 | |
| CN | 1746126 | 3/2006 | |
| CN | 1898401 | 1/2007 | |
| CN | 101553585 | 10/2009 | |
| CN | 101898791 | 12/2010 | |
| CN | 101988158 | 3/2011 | |
| CN | 101988158 B | 3/2011 | |
| CN | 101994012 | 3/2011 | |
| CN | 102745742 | 10/2012 | |
| CN | 103112890 | 5/2013 | |
| CN | 103265069 | 8/2013 | |
| CN | 103343174 | 10/2013 | |
| CN | 103572058 | 2/2014 | |
| CN | 103589872 | 2/2014 | |
| CN | 103880070 | 6/2014 | |
| CN | 103882238 | 6/2014 | |
| CN | 104045111 | 9/2014 | |
| CN | 104310467 | 1/2015 | |
| CN | 105293576 | 2/2016 | |
| CN | 105970006 | 9/2016 | |
| CN | 106082322 | 11/2016 | |
| CN | 106564945 | 4/2017 | |
| CN | 107337232 | 11/2017 | |
| CN | 107814413 | 3/2018 | |
| CN | 108408767 A * | 8/2018 | |
| CN | 108502920 | 9/2018 | |
| CN | 109292809 | 2/2019 | |
| DE | 102012104717 | 12/2012 | |
| EP | 0440406 | 8/1991 | |
| EP | 1409410 | 4/2004 | |
| EP | 1499752 | 1/2005 | |
| EP | 3325679 | 5/2018 | |
| GB | 351841 | 7/1931 | |
| GB | 2291052 | 1/1996 | |
| IN | 223939 B | 4/2004 | |
| IN | 225143 B | 4/2004 | |
| IN | 225748 B | 3/2007 | |
| JP | S50-068996 | 12/1976 | |
| JP | WO2013100048 | 5/2015 | |
| MY | 121143 | 12/2005 | |
| NZ | 200708987 A | 6/2008 | |
| NZ | 555894 | 9/2009 | |
| NZ | 579055 | 9/2010 | |
| RU | 2578876 | 3/2016 | |
| WO | 9851616 | 11/1998 | |
| WO | 01/42520 | 6/2001 | |
| WO | WO-2005068358 A1 * | 7/2005 | ........... C01B 17/901 |
| WO | 2006/105611 | 10/2006 | |
| WO | 2006/105612 | 10/2006 | |
| WO | 2006/105613 | 10/2006 | |
| WO | 2006/105614 | 10/2006 | |
| WO | 2010/016835 | 2/2010 | |
| WO | 2010/034083 | 4/2010 | |
| WO | WO-2013037649 A1 * | 3/2013 | ................ C01F 5/40 |
| WO | 2016/112432 | 7/2016 | |
| WO | 2017/123102 | 7/2017 | |
| WO | 2018/152628 | 8/2018 | |
| WO | 2018158492 | 9/2018 | |
| ZA | 226071 B | 4/2004 | |
| ZA | 200304806 | 8/2004 | |
| ZA | 200307159 | 9/2004 | |
| ZA | 200401215 | 2/2005 | |
| ZA | 200607893 | 9/2005 | |
| ZA | 200603093 | 9/2007 | |

OTHER PUBLICATIONS

English translation of CN 108408767A Description (Year: 2018).*
Jack L. Henry et al. "The System Aluminium Sulfate—Sulfuric Acid—Water at 60°" Journal of the American Chemical Society, Apr. 1949, vol. 71, pp. 1142-1144.
Neil Paul Lee, The Production of Titanium Dioxide Pigment from Waste NZ Steel-making Slag (Mar. 1997) submitted for the degree of doctor of philosophy in chemistry to the victoria university of wellington, NZ. Mar. 1997.
T. Jiang et al, Study on leaching Ti from Ti bearing blast furnace slag by sulphuric acid, Mineral Processing and Extractive Metallurgy (Trans. Inst. Min. Metall. C), 2010, vol. 119, No. 1, pp. 33-38.
Peterson, Shirts and Allen; Production of titanium dioxide pigment from perovskite concentrates, acid sulfation method; United States Department of the Interior, Bureau of Mines, Report of Investigations/ 1992.
William E. Trees et al., "Neutralization of sulfate process titanium dioxide wastes with limestone and lime", Journal WPCF, vol. 51., No. 1, Jan. 1979, pp. 158-162.
European Commission, "Reference Document on Best Available Techniques for the Manufacture of Large Volume Inorganic Chemicals— Solids and Other Industry," Aug. 2007.

* cited by examiner

METHODS OF EXTRACTION OF PRODUCTS FROM TITANIUM-BEARING MATERIALS

CROSS-REFERENCE TO RELATED APPLICATIONS

This is the U.S. National Stage of International Patent Application No. PCT/NZ2019/050159 filed on Dec. 16, 2019, which in turn claims the benefit of New Zealand Patent Application No. 749209 filed on Dec. 14, 2018.

FIELD OF INVENTION

The invention relates to processes for the extraction of products from titanium-bearing materials or a composition produced in a process for the production of titanium dioxide, and more particularly, although not exclusively, extracting titanium dioxide and/or one or more other products from iron making slag.

BACKGROUND

There are numerous reserves of minerals from which valuable constituents cannot currently be recovered through means that are economically viable and/or environmentally sound. One reason for this is that the grade of such constituents within the mineral reserves is too low, resulting in large effluent or by-product generation rates. Another problem can be the refractory nature of such constituents within the mineral structure, making them difficult to recover. In addition, traditional methods for recovering valuable constituents from mineral reserves typically require large amounts of energy and the use of large quantities of hazardous chemicals, resulting in a large amount of waste material and potentially toxic products that need to be disposed of.

Melter slag, produced as a by-product during iron and steel making processes, is one mineral that contains low grades of commercially valuable components, including titanium, aluminium and magnesium. During production of molten-pig iron, impurities are removed as melter slag. For some deposits, the slag is primarily perovskite (calcium titanate) and may contain between 20-40% titanium dioxide.

Known melter slag extraction processes focus on extraction of titanium, due to it having the highest concentration within the slag and the highest value. Titanium is a valuable pigment used in a number of commercial applications such as the production of paints, paper, cement and polymers. In melter slag, titanium is present in the form of perovskite, a titanium-calcium oxide crystalline structure from which recovery is difficult. Titanium is also present in the form of perovskite in a number of naturally occurring ores.

An example of a known method of extraction of titanium from perovskite includes reacting perovskite with carbon at high temperatures in an electrical furnace to produce titanium carbide. The titanium carbide is then chlorinated to produce titanium tetrachloride. Unfortunately, this method is energy intensive and the carbide produced has an extremely high melting point, which creates handling problems in the furnace.

Another method of extracting titanium from perovskite is that published in CA1,052,581. In this method, perovskite is treated by roasting at 1200° C. in hydrogen sulphide gas. This is followed by leaching to remove calcium and iron sulphides which leaves the titanium as titanium oxides. The disadvantages of this process are the high temperatures and use of highly toxic gas.

Other methods for the recovery of titanium from minerals include the processes known as the "sulfate process" and the "chloride process". In the sulfate process, mineral feedstock is treated with concentrated sulfuric acid (H2SO4) and then titanyl sulfate (TiOSO4) is selectively extracted and converted into titanium dioxide. In the chloride process, titanium dioxide in the feedstock is reduced with carbon and then oxidised again with chlorine. Liquid TiCl4 is distilled off and converted back into TiO2 in a pure oxygen flame or in plasma at temperatures of 1200-1700° C. The chloride process requires purer ore or rutile as a feedstock which is much rarer than other feedstocks. The raw material must contain at least 70% rutile.

The sulfate and chloride processes are traditionally practised on ilmenite, a titanium-iron oxide mineral with the idealized formula $FeTiO_3$, from which it is easier to recover titanium. The sulfate process has been proposed for the extraction of titanium from perovskite.

Even minor improvements to a process for extracting saleable products from minerals can have a significant impact on the efficiency, and more particularly, the commercial viability, of such a process.

OBJECT

It is an object of the present invention to provide an improved method of recovering one or more products from a titanium-bearing material comprising perovskite or a composition produced in a process for the production of titanium dioxide, or to at least provide the public with a useful choice.

SUMMARY OF THE INVENTION

In a first aspect, the invention provides a method for the recovery of one or more product from a titanium-bearing material comprising perovskite, the method comprising:

a) contacting the titanium-bearing material with sulfuric acid to form a cake comprising at least titanyl sulfate b) contacting the cake with water and/or dilute sulfuric acid to form a sulfated suspension comprising at least titanyl sulfate c) separating solids from liquid in the sulfated suspension to produce a first permeate (LL) comprising at least titanyl sulfate and a first retentate comprising at least calcium sulfate and silica d) hydrolysing titanyl sulphate in the first permeate to produce a first liquor comprising titanium dioxide hydrate e) separating titanium dioxide hydrate from the first liquor to produce titanium dioxide hydrate and a second liquor (PHL) comprising at least aluminium sulfate f) separating aluminium sulfate from the second liquor (PHL) to produce aluminium sulfate and a third liquor (PAL) comprising mixed metal sulfates.

In one embodiment of the first aspect, the method further comprises the step of:

g) combining calcium carbonate and the third liquor (PAL) to produce a first composition (PAL') which comprises mixed metal sulfates comprising calcium sulfate.

In another embodiment of the first aspect, the method further comprises the step of:
h) separating calcium sulfate from the first composition (PAL') to produce calcium sulfate and a fourth liquor (PNL) comprising mixed metal sulfates.

In another embodiment of the first aspect, the method further comprises the step of:
i) separating magnesium sulfate from the fourth liquor (PNL) to produce magnesium sulfate and a fifth liquor (PML) comprising mixed metal sulfates.

In another embodiment of the first aspect, the method further comprises the step of:
j) combining calcium hydroxide and the fifth liquor (PML) to produce a second composition (PML') which comprises mixed metal hydroxides and/or oxides and calcium sulphate, or combining magnesium hydroxide and the fifth liquor (PML) to produce a second composition (PML') which comprises mixed metal hydroxides and/or oxides.

In another embodiment of the first aspect, the method further comprises the steps of:
k) Recovering the mixed metal oxides and/or hydroxides or the mixed metal oxides and/or hydroxides and calcium sulphate from the second composition (PML') to produce mixed metal solids.

In another embodiment of the first aspect, the method comprises the alternative the step i) of:
i) combining calcium hydroxide and the fourth liquor (PNL) to produce a second composition (PNL') comprising mixed metal oxides and/or hydroxides, calcium sulphate and magnesium sulphate or combining magnesium hydroxide and the fourth liquor (PNL) to produce a second composition (PNL') comprising mixed metal oxides and/or hydroxides and magnesium sulphate.

In another embodiment of the first aspect as described in the immediately preceding paragraph, the method further comprises the alternative step j) of:
j) separating the mixed metal oxides and/or hydroxides or the mixed metal oxides and/or hydroxides and calcium sulphate from the second composition (PNL') to produce mixed metal solids or mixed metal solids comprising calcium sulphate and a fifth liquor (MRL) comprising magnesium sulfate.

In another embodiment of the first aspect as described in the immediately preceding paragraph, the method further comprises the alternative step k) of:
k) recovering magnesium sulfate from the fifth liquor (MRL) to produce magnesium sulfate.

In a second aspect, the invention provides a method for the recovery of one or more product from a titanium-bearing material comprising perovskite, the method comprising:
a) contacting the titanium-bearing material with sulfuric acid to form a cake comprising at least titanyl sulfate
b) contacting the cake with water and/or dilute sulfuric acid to form a sulfated suspension comprising at least titanyl sulfate
c) separating solids from liquid in the sulfated suspension to produce a first permeate (LL) comprising at least titanyl sulfate and a first retentate comprising at least calcium sulfate and silica
d) Separating aluminium sulfate from the first permeate (LL) to produce aluminium sulfate and a first liquor comprising at least titanyl sulfate
e) hydrolysing titanyl sulphate in the first liquor to produce a second liquor (PHL) comprising titanium dioxide hydrate
f) separating titanium dioxide hydrate from the second liquor (PHL) to produce titanium dioxide hydrate and a third liquor (PAL) comprising mixed metal sulfates.

In one embodiment of the second aspect, the method further comprises the step of:
g) combining calcium carbonate and the third liquor (PAL) to produce a first composition (PAL') which comprises mixed metal sulfates comprising calcium sulphate.

In another embodiment of the second aspect, the method further comprises the step of:
h) separating calcium sulfate from the first composition (PAL') to produce calcium sulfate and a fourth liquor (PNL) comprising mixed metal sulfates.

In another embodiment of the second aspect, the method further comprises the step of:
i) separating magnesium sulfate from the fourth liquor (PNL) to produce magnesium sulfate and a fifth liquor (PML) comprising mixed metal sulfates.

In another embodiment of the second aspect, the method further comprises the step of:
j) combining calcium hydroxide and the fifth liquor (PML) to produce a second composition (PML') which comprises mixed metal oxides and/or hydroxides and calcium sulphate, or combining magnesium hydroxide and the fifth liquor (PML) to produce a second composition (PML') which comprises mixed metal oxides and/or hydroxides.

In another embodiment of the second aspect, the method further comprises the step of:
k) Recovering the mixed metal oxides and/or hydroxides and calcium sulphate or mixed metal oxides and/or hydroxides from the second composition (PML') to produce mixed metal solids, or mixed metal solids comprising calcium sulfate.

In another embodiment of the second aspect, the method further comprises the alternative step i) of:
i) combining calcium hydroxide and the fourth liquor (PNL) to produce a second composition (PNL') comprising mixed metal oxides and/or hydroxides, calcium sulphate and magnesium sulphate, or combining magnesium hydroxide and the fourth liquor (PNL) to produce a second composition (PNL') which comprises mixed metal oxides and/or hydroxides and magnesium sulfate.

In a further embodiment of the second aspect as described in the immediately preceding paragraph, the method further comprises the alternative step j) of:
j) separating the mixed metal oxides and/or hydroxides, or the mixed metal oxides and/or hydroxides and calcium sulphate from the second composition (PNL') to produce mixed metal solids, or mixed metal solids comprising calcium sulphate, and a fifth liquor (MRL) comprising magnesium sulfate.

In another embodiment of the second aspect as described in the immediately preceding paragraph, the method further comprises the alternative step k) of:
k) Recovering magnesium sulfate from the fifth liquor (MRL) to produce magnesium sulfate.

In one embodiment of the first or second aspects, the step of combining calcium carbonate and the third liquor (PAL) to produce a first composition (PAL') is conducted under conditions in which titanium is in the $Ti^{4+}$ state and iron is in the $Fe^{2+}$ state to produce a first composition comprising calcium sulfate, one or more titanium oxides and/or hydroxides and mixed metal sulfates. In one embodiment, the first composition further comprises one or more aluminium oxides and/or hydroxides. In this embodiment, the method may further include the step of separating the calcium sulfate, one or more aluminium and/or titanium oxides and/or hydroxides from the composition to produce calcium sulfate, and one or more aluminium and/or titanium oxides and/or hydroxides and a fourth liquor (PNL) comprising mixed metal sulfates. In one embodiment, the step is conducted at an ORP of approximately 270 mV.

In one embodiment of the first or second aspects, the one or more product is chosen from the group consisting of: Titanium dioxide; the first retentate; Calcium sulfate; Silica; Aluminium sulfate; Magnesium sulfate; and, mixed metal solids. In another embodiment, the one or more product is further chosen from one or more liquor or composition produced in a method of the first or second aspect of the invention or further described herein.

In one embodiment of the first or second aspects, a combination of two, three, four, five, six or seven products are recovered in the process. In one embodiment, a combination of titanium dioxide and aluminium sulfate is recovered. In another embodiment, a combination of titanium dioxide and magnesium sulfate is recovered. In another embodiment, a combination of titanium dioxide, magnesium sulfate and aluminium sulfate is recovered. In one embodiment, a combination of titanium dioxide, magnesium sulfate, aluminium sulfate, and calcium sulfate is recovered. In a preferred embodiment, a combination of titanium dioxide, calcium sulfate, silica, aluminium sulfate, magnesium sulfate and mixed metal solids are recovered in the methods of the invention. In a preferred embodiment, a combination of titanium dioxide, the first retentate, calcium sulfate, aluminium sulfate, magnesium sulfate and mixed metal solids are recovered in the methods of the invention.

In one embodiment, the titanium dioxide is recovered in the form of titanium dioxide hydrate. In certain embodiments, CaSO4 is recovered in one or more of the steps of the methods in the form of CaSO4·2H2O (for example, from the first or the second composition). In certain embodiments, aluminium sulphate is recovered in the form of Al2(SO4)3·XH2O (for example, from the second liquor (PHL) or first permeate (LL)), where X is 14 to 18. In certain embodiments, magnesium sulphate is recovered in the form of MgSO4·7H2O or MgSO4·6H2O or MgSO4·1H2O (for example, from the fourth liquor (PNL) or the fifth liquor (MRL)).

In one embodiment of the first or second aspects, the titanium dioxide hydrate, calcium sulphate, silica, aluminium sulphate, magnesium sulphate, or mixed metal oxides and/or hydroxides separated from a composition or liquor are in a precipitated form. In certain embodiments, the step of separating one or more of titanium dioxide hydrate, calcium sulphate, silica, the first retentate, aluminium sulphate, magnesium sulphate, or mixed metal oxides and/or hydroxides comprises one or more of filtration, centrifugation, evaporation, sedimentation and/or hydro-cyclone separation. In certain embodiments, continuous separation methods are used.

In one embodiment of the first or second aspect, the step of separating solids from liquid in the sulfated suspension comprises filtering the sulfated suspension.

In one embodiment of the first or second aspects, the step of separating titanium dioxide hydrate from a liquor comprises the step of filtering titanium dioxide hydrate from the liquor.

In one embodiment of the first or second aspects, the step of separating CaSO4 from the first composition comprises filtering the first composition.

In one embodiment of the first or second aspects, the step of separating the mixed metal hydroxides and/or oxides or mixed metal hydroxides and/or oxides and calcium sulphate from the second composition (PNL' or PML') comprises evaporation and/or filtering the second composition.

In one embodiment of the first or second aspects, the titanium-bearing material and sulfuric acid are contacted in a ratio of from approximately 0.75:1 to approximately 2:1 sulfuric acid to titanium-bearing material. In preferred embodiments, the ratio of sulfuric acid to titanium-bearing material is from approximately 1.3:1 to approximately 1.7:1.

In one embodiment of the first or second aspects, the concentration of sulfuric acid used is preferably from at least approximately 60%, 65%, 70%, 75%, 80%, 85% 90%, 95%, or at least approximately 98%. In preferred embodiments, the concentration of the sulfuric acid used is from approximately 75% to approximately 98%, more preferably approximately 80% to approximately 95% or approximately 80% to approximately 90%.

In another embodiment of the first or second aspects, step a) is conducted so that the combined titanium-bearing material and sulfuric acid reaches a temperature of from approximately 130 degrees C. to approximately 250 degrees C. In a preferred embodiment, the temperature is from approximately 130 to approximately 220 degrees C. In another preferred embodiment the temperature is from approximately 170 or approximately 180 to approximately 210 degrees C.

In one embodiment of the first or second aspects, step a) is conducted (ie mix held at temperature), or the sulfated mixture is contained within a reactor, for a period of from approximately 30 minutes to approximately 4 hours. In one preferred embodiment, the reaction is conducted for a period of up to approximately 3 hours. In another preferred embodiment, the reaction is conducted for up to approximately 2 hours.

In one embodiment of the first or second aspects, the titanium-bearing material comprises a level of titanium dioxide as described in the Detailed Description herein. In another embodiment, the material comprises a level of calcium oxide as described in the Detailed Description herein. In another embodiment, the material comprising at least one or more of aluminium oxide, magnesium oxide and silica, at a level as described in the Detailed Description herein.

In one embodiment of the first or second aspects, the titanium-bearing material has a ratio of titanium dioxide to calcium oxide, titanium dioxide to aluminium oxide, and/or titanium dioxide to magnesium oxide as described in the Detailed Description herein.

In one embodiment of the first or second aspects, the methods further comprise the step of calcining the recovered titanium dioxide hydrate to form calcined titanium dioxide. In one preferred embodiment, the calcined titanium dioxide is milled, coated, washed, dried and/or micronized. In one embodiment, titanium dioxide is pigment grade.

In one embodiment of the first or second aspects, the titanium dioxide (hydrate or otherwise) recovered from a method of the invention is suitable for use as a feedstock for a titanium dioxide pigment manufacturing process.

In one embodiment of the first or second aspects, the titanium-bearing material comprising perovskite is chosen from the group consisting of slag, an ore, upgraded slag, and a concentrate. In one particular embodiment, the titanium-bearing material comprising perovskite is an iron making slag. In one embodiment, the iron making slag is melter slag or blast furnace slag. In another embodiment, the ore is a vanadium titano-magnetite ore. In another embodiment, the slag is a vanadium titano-magnetite slag. In other embodiments, the titanium-bearing material comprising perovskite comprises a combination of two or more different sources of titanium-bearing material.

In particular embodiments, the titanium-bearing material is in the form of a particulate material having an average particle size of less than 180 μm. In preferred embodiments, the particulate material has an average particle size from 10 to 180 μm, or from 40 to 110 μm. In particular embodiments, the particulate material has an average particle size of approximately 30 μm, 45 μm, 60 μm, 70 μm, 80 μm, 90 μm, or 100 μm.

In certain embodiments, the method of the invention further comprises the step of grinding the titanium-bearing material prior to step a) of the process of the first to fourth aspects.

In one embodiment of the first or second aspects, the titanium-bearing material is contacted with sulfuric acid in a continuous reactor. In one embodiment, the sulfation step b) takes place in a continuous reactor adapted for continuous blending of the sulfuric acid, titanium-bearing material and cake comprising titanyl sulfate.

In a preferred embodiment, one or more additional steps of the methods of the first or second aspects of the invention are conducted in a continuous manner. In a preferred embodiment of the first to fourth aspects, the whole method is conducted in a continuous manner.

In a third aspect, the invention provides one or more products produced by a method of the first or second aspects of the invention, the one or more product chosen from the group consisting of: titanium dioxide, magnesium sulphate, the first retentate, calcium sulphate, silica, aluminium sulphate, mixed metal solids.

In certain embodiments, the magnesium sulphate is in the form of $MgSO_4 \cdot 7H_2O$, $MgSO_4 \cdot 6H_2O$ or $MgSO_4 \cdot 1H_2O$. In certain embodiments, the aluminium sulphate is in the form of $Al_2(SO_4)_3 \cdot XH_2O$, where X is 14 to 18. In certain embodiments, the calcium sulphate is in the form of $CaSO_4 \cdot 2H_2O$.

In a fourth aspect, the invention provides one or more liquor or composition produced by a method of the first or second aspects. In one embodiment, the liquor or composition is the first permeate, first liquor, second liquor, third liquor, fourth liquor, fifth liquor, first composition or second composition.

In a fifth aspect, the invention provides the use of the first permeate produced by a method of the first or second aspects of the invention for the production or recovery of titanium dioxide, aluminium sulphate, calcium sulphate, magnesium sulphate and/or mixed metal solids.

In a related aspect, the invention provides a method for the recovery of titanium dioxide, aluminium sulphate, calcium sulphate, magnesium sulphate and/or mixed metal solids from the first permeate produced by a method of the first or second aspects, the method comprising separating titanium dioxide, aluminium sulphate, calcium sulphate, magnesium sulphate and/or mixed metal solids from the permeate or a derivative composition in any order.

In a sixth aspect, the invention provides the use of the first liquor produced by a method of the first or second aspects of the invention for the production or recovery of titanium dioxide, aluminium sulphate, calcium sulphate, magnesium sulphate and/or mixed metal solids.

In a related aspect, the invention provides a method for the recovery of titanium dioxide, aluminium sulphate, calcium sulphate, magnesium sulphate and/or mixed metal solids from the first liquor produced by a method of the first or second aspects, the method comprising separating titanium dioxide, aluminium sulphate, calcium sulphate, magnesium sulphate and/or mixed metal solids from the liquor or a derivative composition in any order.

In a seventh aspect, the invention provides the use of the second liquor produced by a method of the first or second aspects of the invention for the production or recovery of titanium dioxide, aluminium sulphate, calcium sulphate, magnesium sulphate and/or mixed metal solids.

In a related aspect, the invention provides a method for the recovery of titanium dioxide, aluminium sulphate, calcium sulphate, magnesium sulphate and/or mixed metal solids from the second liquor produced by a method of the first or second aspect, the method comprising separating titanium dioxide, aluminium sulphate, calcium sulphate, magnesium sulphate and/or mixed metal solids from the liquor or a derivative composition in any order.

In an eighth aspect, the invention provides the use of the third liquor produced by a method of the first or second aspect of the invention for the production or recovery of calcium sulphate, magnesium sulphate and/or mixed metal solids.

In a related aspect, the invention provides a method for the recovery of calcium sulphate, magnesium sulphate and/or mixed metal solids from the third liquor produced by a method of the first or second aspect, the method comprising separating calcium sulphate, magnesium sulphate and/or mixed metal solids from the liquor or a derivative composition in any order.

In a ninth aspect, the invention provides the use of the fourth liquor produced by a method of the first or second aspect of the invention for the production or recovery of calcium sulphate, magnesium sulphate and/or mixed metal solids.

In a related aspect, the invention provides a method for the recovery of calcium sulphate, magnesium sulphate and/or mixed metal solids from the fourth liquor produced by a method of the first or second aspect, the method comprising separating calcium sulphate, magnesium sulphate and/or mixed metal solids from the liquor or a derivative composition in any order.

In a tenth aspect, the invention provides the use of the fifth liquor produced by a method of the first or second aspect of the invention for the production or recovery of calcium sulphate, magnesium sulphate and/or mixed metal solids.

In a related aspect, the invention provides a method for the recovery of calcium sulphate, magnesium sulphate and/or mixed metal solids from the fifth liquor produced by a method of the first or second aspect, the method comprising separating calcium sulphate, magnesium sulphate and/or mixed metal solids from the liquor or a derivative composition in any order.

In an eleventh aspect, the invention provides the use of the first composition produced by a method of the first or second aspect of the invention for the production or recovery of calcium sulphate, magnesium sulphate and/or mixed metal solids.

In a related aspect, the invention provides a method for the recovery of calcium sulphate, magnesium sulphate and/or mixed metal solids from the first composition produced by a method of the first or second aspect, the method comprising separating calcium sulphate, magnesium sulphate and/or mixed metal solids from the composition or a derivative composition in any order.

In a twelfth aspect, the invention provides the use of the second composition produced by a method of the first or second aspect of the invention for the production or recovery of titanium dioxide, aluminium sulphate, calcium sulphate, magnesium sulphate and/or mixed metal solids.

In a related aspect, the invention provides a method for the recovery of titanium dioxide, aluminium sulphate, calcium sulphate, magnesium sulphate and/or mixed metal solids from the second composition produced by a method of the first or second aspect, the method comprising sequentially separating titanium dioxide, aluminium sulphate, calcium sulphate, magnesium sulphate and/or mixed metal solids from the liquor or a derivative composition in any order.

In a thirteenth aspect, the invention provides the use of the cake or sulphated suspension produced by a method of the first or second aspects of the invention for the production or recovery of titanium dioxide, aluminium sulphate, calcium sulphate, silica, the first retentate, magnesium sulphate and/or mixed metal solids.

In a related aspect, the invention provides a method for the recovery of titanium dioxide, aluminium sulphate, calcium sulphate, silica, the first retentate, magnesium sulphate and/or mixed metal solids from the first permeate produced by a method of the first or second aspects, the method comprising separating titanium dioxide, aluminium sulphate, calcium sulphate, silica, the first retentate, magnesium sulphate and/or mixed metal solids from the cake or sulphated suspension or a derivative composition in any order.

In a fourteenth aspect, the invention provides a method for recovering one or more product from a composition produced in a process for the production of titanium dioxide, the method comprising at least the steps of:
 a) combining calcium carbonate and the composition to produce a composition (A) which comprises calcium sulphate; and,
 b) separating calcium sulfate from the second composition (A) to produce calcium sulfate and a composition (B) comprising mixed metal sulfates.

In one embodiment, the method further comprises the step of:
 c) separating magnesium sulfate from composition (B) to produce magnesium sulfate and a composition (C) comprising mixed metal sulfates.

In another embodiment, the method further comprises the step of:
 d) combining calcium hydroxide and the composition (C) to produce a composition (D) comprising mixed metal oxides and/or hydroxides and calcium sulphate; OR
 d1) combining magnesium hydroxide and the composition (C) to produce a composition (D) comprising mixed metal oxides and/or hydroxides.

In another embodiment, the method further comprises the step of:
 e) recovering the mixed metal oxides and/or hydroxides and calcium sulfate, or the mixed metal oxides and/or hydroxides from the composition (D) to produce mixed metal solids or mixed metal solids comprising calcium sulfate.

In a fifteenth aspect, the invention provides a method for recovering one or more product form a composition produced in a process for the production of titanium dioxide, the method comprising at least the steps of:
 a) combining calcium carbonate and the composition to produce a composition (A) which comprises calcium sulphate; and,
 b) separating calcium sulfate from the second composition (A) to produce calcium sulfate and a composition (B) comprising mixed metal sulfates.

In another embodiment, the method further comprises the step of:
 c) combining calcium hydroxide and the composition (B) to produce a composition (C') comprising magnesium sulfate, mixed metal oxides and/or hydroxides and calcium sulphate; OR
 c1) combining magnesium hydroxide and the composition (B) to produce a composition (C') comprising magnesium sulfate and mixed metal oxides and/or hydroxides.

In one embodiment, the method further comprises the step of:
 d) separating the mixed metal oxides and/or hydroxides and calcium sulfate, or the mixed metal oxides and/or hydroxides from the composition (C') to produce mixed metal solids comprising calcium sulfate or mixed metal solids and a composition (D') comprising magnesium sulfate.

In one embodiment, the method further comprising the step of:
 e) recovering magnesium sulfate from composition (D') to produce magnesium sulfate.

In one embodiment of the fourteenth or fifteenth aspects, step a) is conducted under conditions in which titanium is in the $Ti^{4+}$ state and iron is in the $Fe^{2+}$ state to produce composition (A) comprising calcium sulfate and one or more titanium oxides and/or hydroxides. In one embodiment, the first composition further comprises one or more aluminium oxides and/or hydroxides. In this embodiment, step b) may comprise separating calcium sulfate, and one or more aluminium and/or titanium oxides and/or hydroxides from the composition (A) to produce calcium sulfate, and one or more aluminium and/or titanium oxides and/or hydroxides and a composition (B) comprising mixed metal sulfates. In one embodiment, the step (a)) is conducted at an ORP of approximately 270 mV.

In one embodiment, the composition produced in a process for the production of titanium dioxide is an acidic waste composition. In one embodiment, the composition is an acidic composition produced after recovery of titanium dioxide in the process for the production of titanium dioxide. In one embodiment, the composition is an acidic composition produced after the recovery of titanium dioxide and aluminium in the process for the production of titanium dioxide.

In a sixteenth aspect, the invention provides a method for producing a titanium dioxide feedstock for a titanium dioxide pigment manufacturing process comprising one of:
 steps a) to e) of the first aspect
 steps a) to f) of the second aspect In one embodiment, the method further comprises calcining hydrated titanium dioxide recovered in the method.

In another aspect, the invention provides the use of titanium dioxide recovered by a method of the invention as herein described as a titanium dioxide feedstock for a titanium dioxide pigment manufacturing process.

In one embodiment, the titanium dioxide pigment manufacturing process is the chloride process.

The invention also includes the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent to those skilled in the art upon reading of the following description.

BRIEF DESCRIPTION OF THE DRAWINGS

Embodiments of the invention will be described in the specification, by way of example only, with reference to the accompanying drawings in which.

DETAILED DESCRIPTION OF PREFERRED EMBODIMENTS

Figure 1:
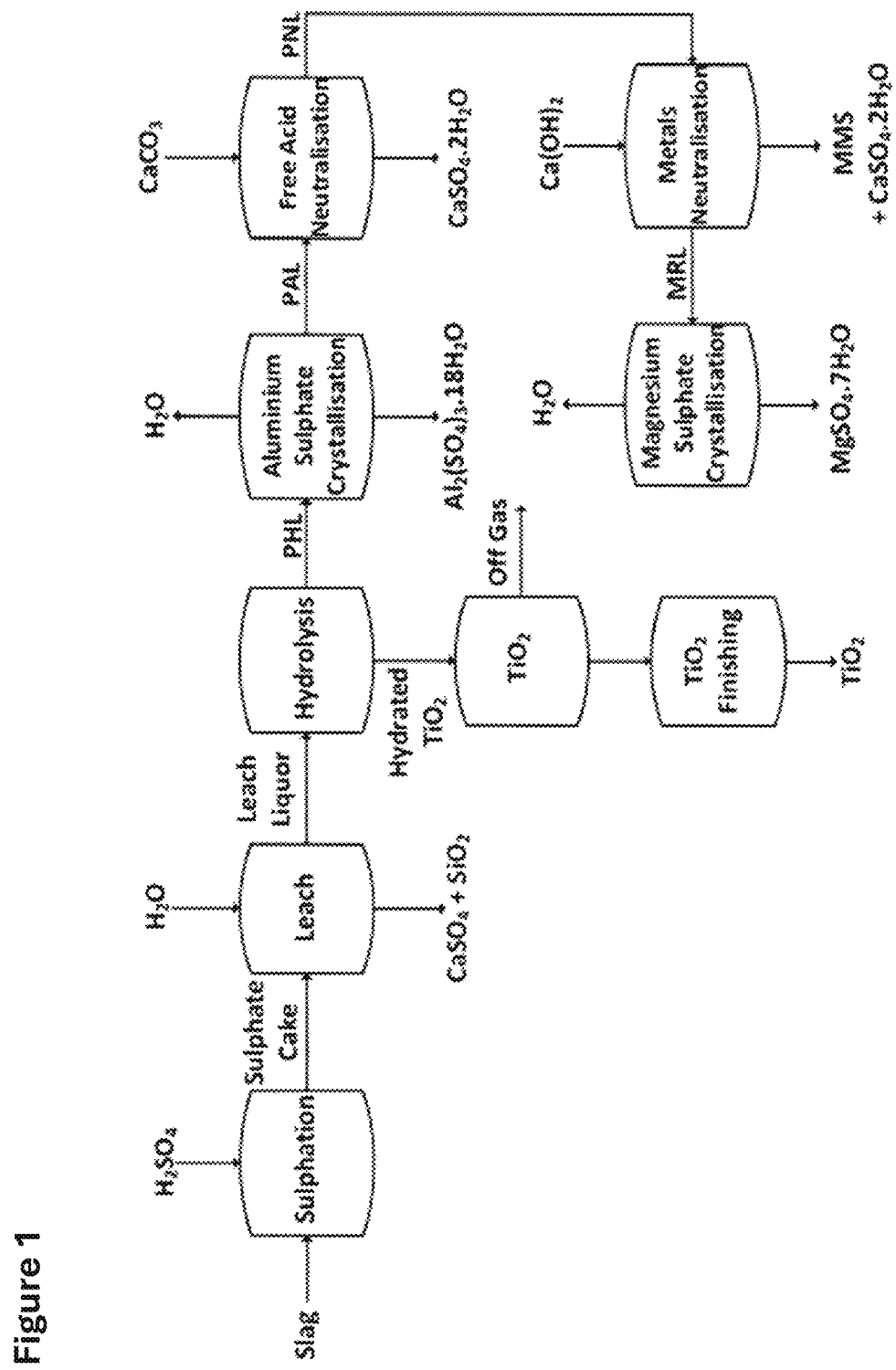
FIG. 1 shows a process flow diagram depicting one embodiment of the invention.

The inventors have previously demonstrated novel methods and apparatus for the commercially viable extraction of a number of products from melter slag. These products can include at least titanium dioxide, aluminium sulphate and magnesium sulphate. During continued research, the inventors have identified a number of improvements which provide significant advantages to the efficiency and economy of such processes as well as reducing their environmental impact. While the inventors' research has focused on processes for the recovery of value products from melter slag, they believe the processes will be equally useful for the recovery of such products from other titanium-bearing materials including, for example, naturally occurring ores, concentrates, other slags, upgraded slags, red mud and also compositions produced in processes for the production of titanium dioxide.

Definitions

Unless otherwise defined, the following terms as used throughout this specification are defined as follows:

Throughout the specification and any claims which follow, unless the context requires otherwise, the word "comprise", and variations such as "comprises" and "comprising" and the like, are to be construed in an inclusive sense as opposed to an exclusive sense, that is to say, in the sense of "including, but not limited to".

As used herein, unless the context requires otherwise, "titanium-bearing material" is any appropriate material comprising titanium dioxide in the form of perovskite. In a preferred embodiment, the titanium-bearing material also includes one or more of magnesium oxide, aluminium oxide, calcium oxide, silicon dioxide, iron oxide, vanadium oxide. In certain embodiments, the material also includes manganese oxide and chrome oxide. In one embodiment, the material comprises titanium dioxide, magnesium oxide, and aluminium oxide. In another embodiment, the material comprises titanium dioxide, magnesium oxide, aluminium oxide and calcium oxide. In certain embodiments the titanium-bearing material includes slag, upgraded slag, an ore, a concentrate. In certain embodiments, the slag is an iron making slag, or vanadium-titanium-magnetite (VTM) slag. In one embodiment, the iron making slag is melter slag or blast furnace slag. In another embodiment, the titanium-bearing material is red mud. In certain embodiments, the titanium-bearing material comprises a combination of two or more different forms of titanium-bearing materials.

"Slag" is any waste matter separated from metals during the smelting or refining of an ore. In certain embodiments, the slag is iron making slag, or vanadium titano-magnetite slag.

"Iron making slag" is a slag resulting from a steel or iron manufacturing process. In certain embodiments, an iron making slag is melter (or smelter) slag or blast furnace slag.

"Upgraded slag" is a material that has had a target metal oxide increased in concentration by separating and removing one or more other metal species, using for example a pyro-metallurgical technique.

A "VTM slag" is a slag obtained during the processing or manufacture of products (eg steel and iron) from a VTM-containing material, such as a VTM-containing ore.

A "concentrate" is a material that has had a target metal oxide increased in concentration by separating and removing one or more other metal species using a form of concentration such as, for example, gravimetric separation, float separation or magnetic separation.

An "ore" is a naturally occurring solid material from which a metal or mineral may be extracted. In one embodiment, the ore is a vanadium titano-magnetite ore.

The term "cake" is used herein to refer to a solid material comprising titanyl sulfate produced as a result of the sulfation of the titanium-bearing material and includes reference to a particulate or powdered form of the cake which may be formed during the process.

The term "CaISi" may be used in the specification. This refers to the first retentate of the process of the invention. The CaISi comprises calcium sulphate and silica. In particular embodiments, the residue may further comprises unreacted metal oxides.

The term "free acid" or "free acidity" refers to the sulfuric acid content of a composition or liquor.

The term "reactor" includes any device consisting of one or more vessels and/or towers or piping arrangements in which materials of the invention can be processed, mixed and/or heated. Examples of reactors of the invention include continuous or batch infusion reactors. In a preferred embodiment, the reactor(s) is adapted to run a continuous process. In one preferred embodiment, the reactor used in a sulfation step of the various aspects of the invention is adapted to break up the cake which forms in that step into a powdered or particulate form.

"Perovskite" refers to a titanium-calcium oxide mineral composed of calcium titanate $CaTiO_3$. Perovskite typically has a cubic crystalline structure although the term as used herein is intended to refer to any form of calcium titanate. The terms perovskite and calcium titanate may be used interchangeably.

The term "water" is referred to herein as being for example a solute or reactant to achieve the processes described. It will be appreciated by those of skill in the art that the term water does not imply that pure water is used; the water may be an aqueous solution containing one or more other components.

Where a concentration or percentage of an element is referred to (for example iron), it will be appreciated by those of skill in the art that the element is likely to be bound to other species, for example in ionic salts such as iron sulphate. However, analytical techniques allow the expression of the total amount of the element in the sample. In these cases, it is the total amount of the element in the sample that is being referred to, bound or unbound.

"Calcining" refers to a process whereby a substance is heated to a high temperature but below the melting or fusing point, causing loss of moisture, reduction or oxidation, and the decomposition of carbonates and other compounds.

A "product" is any compound or mixture of compounds capable of being recovered in a process of the invention; by way of non-limiting example, titanium dioxide, magnesium sulphate, aluminium sulphate, calcium sulphate, the first retentate, mixed metal solids. In certain embodiments, a "product" may be one or more liquor or composition produced in a process of the invention.

Where reference is made to "recovering" a chemical compound or compounds (in one embodiment for example, a product or products of the invention), it should not be taken to mean that the product is recovered in 100% purity. Also, where reference is made to "purifying" (or like terms, such as purification) of a particular chemical compound it should not be taken to mean that the compound is recovered in 100% purity. It will be appreciated that some level of contamination of a compound with other compounds may occur and be tolerated. Similarly, where reference is made to "separating" chemical compounds (in one embodiment for example, a product or products of the invention) from a composition or liquor or from each other, it should not be taken to mean that the compound or compounds are separated from each other, a liquor or composition completely. It will be appreciated that some level of contamination of one with the other may be present and tolerated.

Where reference is made to separating solids from liquids any appropriate means may be used including, for example, filtration, centrifugation, settling, sedimentation, float separation and the like. In certain embodiments, continuous separation methods are preferred. Such methods may utilise, for example, basket centrifuges or conical plate centrifuges.

Where used herein, reference to any chemical compounds such as oxides, hydroxides and sulfates of particular chemical elements (for example titanium, magnesium, aluminium, calcium, silicon and mixed metals) should be taken to include reference to those compounds in any hydration state or an anhydrous state unless the context requires otherwise.

Reference may be made herein to recovering, separating, and/or producing a "titanium dioxide feedstock for a titanium dioxide pigment manufacturing process". This is intended to encompass any appropriate compositions recovered from a process of the invention which comprise titanium dioxide and may be fed to a titanium dioxide pigment manufacturing process. Persons of skill in the art to which the invention relates will readily appreciate appropriate titanium dioxide feedstocks from the methods of the invention that may be of use in a titanium dioxide pigment manufacturing process.

However, by way of example the feedstocks may include titanium dioxide hydrate or calcined titanium dioxide recovered from a process of the invention. In addition, skilled persons will readily appreciate titanium dioxide pigment manufacturing processes of relevance. However, by way of example, the titanium dioxide feedstock produced by a method of the invention may be used in the process known as the "chloride process".

"Titanium dioxide hydrate" or like phrases as referred to herein is intended to encompass compositions containing both titanium dioxide and titanium dioxide hydrate. It will be appreciated by those of skill in the art that the product of the hydrolysis of titanyl sulphate will be a mixture of titanium dioxide and titanium dioxide hydrate. Unless the context requires otherwise, where the term titanium dioxide hydrate is referred to herein, it will be understood that titanium dioxide may also be present. The same should be understood for other chemical compounds referred to herein.

Where a proportion, ratio or percentage of titanium dioxide in a feedstock is referred to, it will be appreciated by a person skilled in the art that the actual form of the titanium dioxide may not be in a form appropriate to be purified. For example, in perovskite the form of the titanium dioxide is predominantly as calcium titanate ($CaTiO_3$). Where analytical results or wording referring to titanium dioxide are provided, those analytical results or wording are intended to be read as the amount of titanium dioxide that may be bound with other elements, for example in calcium titanate. The same should be understood for other metal oxides referred to herein.

The phrase "producing rutile titanium dioxide" or similar is not to be interpreted as meaning that pure, 100% rutile titanium dioxide is formed. It will be appreciated by those of skill in the art that some degree of contamination by contaminants or other forms of titanium dioxide will be present, although the predominant species present will be rutile titanium dioxide.

A "dopant" is an impurity added usually in comparatively small amounts to a substance to alter its crystal growth characteristics and morphology change characteristics.

"Sulphuric acid" as referred to herein may be of any concentration and is referred to as a weight for weight percentage (% w/w) concentration in aqueous solution. Other nomenclature may include m % or simply %. These are intended to be used interchangeably and will be understood as being so by those of skill in the art.

"Mixed metal solids" as used herein refers to the balance of metal species present following removal of target metal species in a method of the invention. Mixed metal solids may comprise, for example, one or more (in one embodiment, a mix of two or more) metal oxide and/or metal hydroxide. In one embodiment, the mixed metal solids also comprise calcium sulphate. In certain embodiments, the mixed metal solids may comprise oxides and/or hydroxides of one or more of titanium, aluminium, magnesium, iron, manganese, vanadium, chrome, niobium and zircon.

"Precipitate", "precipitation" and like terms are used herein to refer to a process in which a chemical compound is deposited in solid form from a solution. These terms should be taken to include reference to crystallising or crystallisation of the chemical compound and to an insoluble product from a hydrolysis reaction. Reference to a "precipitate" of a chemical compound refers to the solid resulting from such a precipitation process and should be understood to include reference to a crystalline form of a chemical compound.

"Composition" should be taken broadly to include a mixture of two or more chemical compounds. A composition may be aqueous, a suspension, or any other form of a mixture of one or more solids and/or liquids. For example, in certain embodiments of the invention a composition X (a liquor for example) may be in aqueous form and a neutralising agent is added to form another composition Y. Composition Y may comprise one or more solid and liquid as the presence of the neutralising agent may have precipitated certain compounds contained in the original composition X. Until the precipitate material is separated from liquid present it is considered to form part of the composition Y.

Reference may be made herein to separating or recovering a product from a composition or liquor or a derivative composition. A "derivative composition" is a composition (including reference to a liquor) downstream of a specified composition (including reference to a liquor). For example, in certain embodiments of the invention, a third liquor is subject to a step to form a first composition comprising calcium sulfate. Calcium sulfate is separated from the first composition to produce a fourth liquor comprising mixed metal sulfates. Magnesium sulfate is then recovered from the fourth liquor to produce magnesium sulfate and a fifth liquor comprising mixed metal sulfates. In this example the first composition, fourth liquor and fifth liquor are derivative compositions of the third liquor, the fourth and fifth liquors derivative compositions of the first composition and the fifth liquor a derivative of the fourth liquor.

Acid to feedstock ratios referred to are on a weight for weight basis; ie the weight of acid used to react with a given weight of feedstock (such as ore or slag).

LL means leach liquor. PHL means post hydrolysis liquor. PAL means post aluminium liquor. PNL means post neutralisation liquor. PML means post magnesium liquor. MRL means magnesium rich liquor. Such descriptions for various compositions of the processes of the invention are used herein to assist the reader in understating the invention and should not be taken to limit the scope of the invention in any way, unless the context clearly requires otherwise.

The specification may include alternative spellings of the words "sulfur", "sulfation", "sulfate" and the like; for example, as "sulphur", "sulphation" and "sulphate".

The Processes

Following extensive analysis, the inventors have devised improved methods for recovering one or more products from titanium-bearing materials comprising perovskite or methods for recovering products from compositions produced in a process for the production of titanium dioxide. These products include one or more, two or more, three or more, four or more, five or more, six or all of the following: titanium dioxide, aluminium sulfate, magnesium sulfate, calcium sulphate, silica, a composition comprising a combination of calcium sulfate and silica (eg the first retentate), and mixed metal solids. In one embodiment, the product is a feedstock for a titanium dioxide pigment manufacturing process.

In designing the processes of the invention, the inventors have had to overcome a number of problems and often competing requirements including for example: the refractory nature of perovskite, environmental impact, efficiency of product recovery, cost, energy requirements, the relative recovery of different products, timing of recovery of different products. For example, if a method is optimised for recovery of one product, the recovery of other products and the efficiency of the process, for example, may suffer. In addition, the amount of waste generated may be undesirable. The inventors believe that the novel combination of steps and/or reagents used in the processes of the invention provide for efficient recovery of product(s) in desirable yields, in a commercially viable way.

The inventors have found that the order of the steps and/or the combination of reagents used in the methods of the invention are important factors in optimising yields of the most valuable materials. For example, while the recovery of aluminium sulfate from the processes prior to titanyl sulphate hydrolysis is viable in the context of the invention, the inventors have found greater efficiency and higher yield of titanium dioxide if aluminium sulphate is recovered after titanyl sulphate hydrolysis. Hence, in one embodiment, the latter is preferred.

In addition, while the recovery of magnesium sulphate from the processes prior to recovery of mixed metal solids is viable in the context of the invention, the inventors have found greater efficiency, higher yield and improved purity of magnesium sulphate if mixed metal solids are recovered first. In certain embodiments, it allows the level of manganese and/or iron to be reduced or eliminated from the magnesium sulfate product. In addition, the inventors have found that the magnesium sulphate crystals are in a more desirable form if mixed metal sulphates are recovered first; the crystals are easier to filter for example and liquor removal is improved.

Additionally, the step of magnesium sulphate precipitation and recovery is carried out after the recovery of aluminium sulphate and recovery of titanium dioxide. If magnesium sulphate precipitation is carried out prior to recovery of either aluminium sulphate or titanium dioxide, the co-precipitation of these components with magnesium sulphate would reduce the economic viability of the method and reduce the purity with which the products could be obtained.

The inventors have also found that the use of a two-step neutralisation process using $CaCO_3$ and $Ca(OH)_2$ or $Mg(OH)_2$ as neutralising agents in relevant steps of the methods of the invention is advantageous. The use of $CaCO_3$ and $Ca(OH)_2$ or $Mg(OH)_2$ allows for a stepwise increase in pH which provides optimal conditions for recovery of calcium sulphate, mixed metal solids and magnesium sulphate, while minimising the acidity of any waste water. This also allows for an improved quality of products while minimising any waste generated. The inventors contemplate these steps forming an independent method which can provide for efficient recovery of such products from compositions which are derived from processes for the production of titanium dioxide. This may have the benefit of increasing the utilisation of such compositions, which have traditionally been considered to be waste products which are required to be disposed of, allowing for the extraction of further value from such processes and reducing their environmental impact.

The processes of the invention are described herein before in the "Summary of Invention" section. Further description of the various aspects, embodiments and steps of the methods are provided below.

The processes of the invention or one or more individual step of a process of the invention may be conducted in a batch-wise manner or in a continuous manner. In a preferred embodiment, one or more step is conducted in a continuous manner. Skilled persons will readily appreciate methods and apparatus that can be employed to run continuous steps or processes. In one embodiment, all of the steps are conducted in a continuous manner. In another embodiment, the leach step and/or the hydrolysis step are conducted batch-wise.

Feedstock

In one aspect, the feedstock used in a process of the invention may be any titanium-bearing material comprising perovskite. However, in certain embodiments the titanium-bearing material is chosen from a slag, an upgraded slag, an ore, a concentrate. In a preferred embodiment, the slag is an iron making slag. In one particular embodiment, the iron making slag is melter slag obtained from New Zealand Steel. In other embodiments, the iron making slag is melter slag obtained from South Africa or blast furnace slag obtained from China or Russia. In another embodiment, the material is an ore. In certain embodiments, the ore is a natural reserve found in North America or South America.

In certain embodiments, the titanium-bearing material comprising perovskite may comprise a combination of two or more different materials. For example, it may comprise a combination of a naturally occurring ore and slag.

In certain embodiments, in addition to perovskite, the titanium-bearing material of use in the methods of the invention will preferably also comprise one or more of aluminium oxide and magnesium oxide. In certain embodiments, the material also comprises one or more of iron oxide and vanadium oxide. In other embodiment, the material may also comprise chrome oxide and/or manganese oxide.

In one embodiment, the titanium-bearing material comprises from at least approximately 5% to at least approximately 65% w/w titanium dioxide. In certain embodiments, the titanium-bearing material comprises at least approximately 5%, 10%, 15%, 20%, 25%, 30%, 35%, 40%, 45%, 50%, 55%, 60% or 65% w/w titanium dioxide. In certain embodiments, the titanium-bearing material comprises approximately 5%, 10%, 15%, 20%, 25%, 30%, 35%, 40%, 45%, 50%, 55%, 60% or 65% w/w titanium dioxide. In certain embodiments, the titanium-bearing material comprises from approximately 15% to approximately 60% titanium dioxide or to approximately 65% titanium dioxide. In certain embodiments, the titanium-bearing material comprises from approximately 30% to approximately 40% titanium dioxide. In one embodiment, the titanium-bearing material comprises from approximately 30% to approximately 35% w/w titanium dioxide. In another embodiment, the titanium-bearing material comprises from approximately 25% to approximately 45% titanium dioxide. In one embodiment, the titanium-bearing material comprises from approximately 5% to approximately 25% titanium dioxide.

In one embodiment, the titanium-bearing material is an iron making slag and comprises from at least approximately 5% to at least approximately 40% w/w titanium dioxide. In certain embodiments, the titanium-bearing material comprises at least approximately 5%, 10%, 15%, 20%, 25%, 30%, 35% or 40% w/w titanium dioxide. In certain embodiments, the iron making slag comprises from approximately 5% to approximately 65%, from approximately 5% to approximately 60%, from approximately 5% to approximately 55%, from approximately 5% to approximately 50%, from approximately 5% to approximately 45%, from approximately 5% to approximately 40%, from approximately 5% to approximately 35%, from approximately 5% to approximately 30% w/w titanium dioxide. In certain embodiments, the material comprises approximately 5%, 10%, 15%, 20%, 25%, 30%, 35%, 40%, 45%, 50%, 55%, 60% or 65% w/w titanium dioxide. In certain embodiments, the iron making slag comprises from approximately 15% to approximately to approximately 40% titanium dioxide, from approximately 15% to approximately 35%, or approximately 15% to approximately 30% w/w titanium dioxide. In certain embodiments, the iron making slag comprises approximately 20%, 21%, 22%, 23%, 24%, 25%, 26%, 27%, 28%, 29% 30%, 31%, 32%, 33%, 34% or 35% titanium dioxide. In other embodiments, the iron making slag comprises approximately 36%, 37%, 38%, 39%, or 40% titanium dioxide.

In another embodiment, the titanium-bearing material is an ore and comprises from at least approximately 15% to at least approximately 60% w/w titanium dioxide. In certain embodiments, the ore comprises at least approximately 5%, 10%, 15%, 20%, 25%, 30%, 35%, 40%, 45%, 50%, 55% or 60% w/w titanium dioxide. In certain embodiments, the ore comprises approximately 5%, 10%, 15%, 20%, 25%, 30%, 35%, 40%, 45%, 50%, 55% or 60% w/w titanium dioxide.

In another embodiment, the titanium-bearing material is an ore concentrate and comprises from at least approximately 15% to at least approximately 45% or from at least approximately 25% to at least approximately 45% w/w titanium dioxide. In certain embodiments, the ore concentrate comprises at least approximately 15%, 20%, 25%, 30%, 35%, 40%, or 45% w/w titanium dioxide. In certain embodiments, the ore concentrate comprises approximately 15%, 20%, 25%, 30%, 35%, 40%, or 45% w/w titanium dioxide.

In another embodiment, the titanium-bearing material is red mud and comprises from at least approximately 5% to at least approximately 25% w/w titanium dioxide. In one embodiment, the red mud comprises approximately 5% to approximately 35% titanium dioxide. In certain embodiments, the red mud comprises approximately 5%, 10%, 15%, 20% or 25% titanium dioxide.

In one embodiment, the titanium-bearing material comprises from at least approximately 2% to at least approximately 60% w/w calcium oxide. In one embodiment, it comprises from approximately 2% to approximately 60% calcium oxide. In one embodiment, the titanium-bearing material comprises from approximately 5% to approximately 60% calcium oxide. In one embodiment, the material comprises from approximately 5% to approximately 25% w/w calcium oxide. In one particular embodiment, the titanium-bearing material comprises from approximately 10% to approximately 20% w/w calcium oxide. In another embodiment, the titanium-bearing material comprises from approximately 25% to approximately 40% w/w calcium oxide. In another embodiment, the titanium-bearing material comprises from approximately 10% to approximately 60% calcium oxide. In another embodiment, the material comprises from approximately 2% to approximately 10% calcium oxide. In certain embodiments, the titanium-bearing material comprises approximately 5%, 10%, 15%, 20%, 25%, 30%, 35%, 40%, 45%, 50%, 55%, or 60% w/w calcium oxide.

In one embodiment, the titanium-bearing material is an iron making slag and comprises from at least approximately 5% to at least approximately 40% w/w calcium oxide. In one embodiment, slag comprises from approximately 5% to approximately 40%, from approximately 5% to approximately 35%, from approximately 5% to approximately 30% or from approximately 5% to approximately 25% w/w calcium oxide. In certain embodiments, the slag comprises approximately 5%, 10%, 15%, 20%, 25%, 30%, 35%, 40% or 45% w/w calcium oxide. In one particular embodiment, the slag comprises from approximately 10% to approximately 30% w/w calcium oxide. In one embodiment, the slag comprises approximately 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34% or 35% calcium oxide.

In another embodiment, the titanium-bearing material is an ore and comprises from at least approximately 10% to at least approximately 60% w/w calcium oxide. In one embodiment, the ore comprises from approximately 10% to approximately 60% w/w calcium oxide. In certain embodiments, the ore comprises approximately 10%, 15%, 20%, 25%, 30%, 35%, 40%, 45%, 50%, 55% or 60% w/w calcium oxide.

In another embodiment, the titanium-bearing material is an ore concentrate and comprises from at least approximately 15% to at least approximately 40% w/w calcium oxide. In other embodiments it comprises from approximately 15% to approximately 40%, from approximately 20% to approximately 40% or from approximately 25% to approximately 40% w/w calcium oxide. In certain embodiments, the ore concentrate comprises approximately 15%, 20%, 25%, 30%, 35%, or 40% w/w calcium oxide.

In another embodiment, the titanium-bearing material is red mud and comprises from at least approximately 2% to at least approximately 10% w/w calcium oxide. In one embodiment, the red mud comprises from approximately 2% to approximately 10% w/w calcium oxide. In certain embodiments, the red mud comprises approximately 2%, 3%, 4%, 5%, 6%, 7%, 8%, 9% or 10% calcium oxide.

In one embodiment, the titanium-bearing material comprises from at least approximately 1% to at least approximately 50% w/w silica. In one embodiment, the titanium-bearing material comprises from approximately 1% to approximately 50% w/w silica. In one embodiment, the material comprises from approximately 1% to approximately 40% silica. In another embodiment, the material comprises from approximately 3% to approximately 50% silica. In certain embodiments, the titanium-bearing material comprises approximately 5% to approximately 25% w/w silica. In one particular embodiment, the titanium-bearing material comprises from approximately 10% to approximately 20% w/w silica. In another embodiment, the titanium-bearing material comprises from approximately 1% to approximately 40% silica. In another embodiment, the titanium-bearing material comprises from approximately 10% to approximately 35% silica. In certain embodiments, the titanium-bearing material comprises approximately 1%, 2%, 3%, 4%, 5%, 10%, 15%, 20%, 25%, 30%, 35%, or 40% w/w silica.

In one embodiment, the titanium-bearing material is an iron making slag and comprises from at least approximately 5% to at least approximately 30% w/w silica. In one embodiment, the slag comprises from approximately 5% to approximately 30% w/w silica. In certain embodiments, the slag comprises approximately 5%, 10%, 15%, 20%, 25%, 30% w/w silica. In one particular embodiment, the slag comprises from approximately 10% to approximately 20% w/w silica. In one embodiment, the slag comprises approximately 10%, 11%, 12%, 13%, 14%, 15%, 16%, 17%, 18%, 19%, 20%, 21%, 22%, 23%, 24%, 25%, 26%, 27%, 28%, 29%, or 30% silica.

In another embodiment, the titanium-bearing material is an ore and comprises from at least approximately 1% to at least approximately 40% w/w silica. In one embodiment, the titanium-bearing material is an ore and comprises from approximately 1% to approximately 40% w/w silica. In certain embodiments, the titanium-bearing material is an ore and comprises approximately 5%, 10%, 15%, 20%, 25%, 30%, 35% or 40% w/w silica.

In another embodiment, the titanium-bearing material is an ore concentrate and comprises from at least approximately 10% to at least approximately 35% w/w silica. In one embodiment, the titanium-bearing material is an ore concentrate and comprises from approximately 10% to approximately 35% w/w silica. In certain embodiments, the titanium-bearing material is an ore concentrate and comprises approximately 10%, 15%, 20%, 25%, 30% or 35% w/w silica.

In another embodiment, the titanium-bearing material is red mud and comprises from at least approximately 3% to at least approximately 50% w/w silica. In one embodiment, the red mud comprises from approximately 3% to approximately 50% w/w silica. In certain embodiments, the red mud comprises approximately 3%, 5%, 10%, 15%, 20%, 25%, 30%, 40%, 45%, or 50% w/w silica.

In one embodiment, the titanium-bearing material comprises from at least approximately 0% to at least approximately 20% w/w magnesium oxide. In one embodiment, the titanium-bearing material comprises from approximately 0% to approximately 20% w/w magnesium oxide. In one embodiment, the titanium-bearing material comprises from approximately 1% to approximately 20% or from 5% to approximately 20% magnesium oxide. In another embodiment, the material comprises from approximately 10% to approximately 15% magnesium oxide. In another embodiment, the material comprises from approximately 1% to approximately 5% magnesium oxide. In certain embodiments, the titanium-bearing material comprises approximately 1%, 2%, 3%, 4%, 5%, 10%, 15%, or 20%, w/w magnesium oxide.

In one embodiment, the titanium-bearing material is an iron making slag and comprises least approximately 5% to approximately 20% w/w magnesium oxide. In certain embodiments, the titanium-bearing material comprises approximately 5%, 10%, 15%, or 20%, w/w magnesium oxide. In one particular embodiment, the titanium-bearing material comprises from approximately 10% to approximately 15% w/w magnesium oxide. In one embodiment, the titanium-bearing material comprises approximately 10%, 11%, 12%, 13%, 14% or 15% magnesium oxide.

In another embodiment, the titanium-bearing material is an ore and comprises from at least approximately 0% to at least approximately 5% magnesium oxide. In one embodiment, the ore comprises from approximately 0% to approximately 5% magnesium oxide. In one embodiment, the ore comprises from at least approximately 1% to at least approximately 5% magnesium oxide. In one embodiment, the ore comprises from approximately 1% to approximately 5% magnesium oxide. In certain embodiments, the ore comprises approximately 1%, 2%, 3%, 4% or 5% w/w magnesium oxide.

In another embodiment, the titanium-bearing material is an ore concentrate and comprises from at least approximately 1% to at least approximately 5% magnesium oxide. In one embodiment, the ore concentrate comprises from approximately 1% to approximately 5% magnesium oxide. In certain embodiments, the ore comprises approximately 1%, 2%, 3%, 4% or 5% w/w magnesium oxide. In one embodiment, the ore concentrate comprises from approximately 2% to approximately 3%, for example 2.5%.

In one embodiment, the titanium-bearing material comprises from at least approximately 0% to at least approximately to at least approximately 25% w/w aluminium oxide. In one embodiment, the material comprises from approximately 0% to approximately 25% aluminium oxide. In one embodiment, the material comprises from approximately 10% to approximately 25% w/w aluminium oxide. In one particular embodiment, the material comprises from approximately 15% to approximately 20% w/w aluminium oxide. In another embodiment, the material comprises from approximately 10% to approximately 20% w/w aluminium oxide. In another embodiment, the material comprises from approximately 0% to approximately 15% aluminium oxide. In one embodiment, the material comprises from approximately 1% to approximately 15% aluminium oxide. In another embodiment, the material comprises from approximately 1% to approximately 10% aluminium oxide. In certain embodiments, the material comprises approximately 1%, 2%, 3%, 4%, 5%, 6%, 7%, 8%, 9%, 10%, 11%, 12%, 13%, 14%, 15%, 16%, 17%, 18%, 19%, 20% or 25% aluminium oxide.

In one embodiment, the titanium-bearing material is an iron making slag and comprises from at least approximately 10% to at least approximately 25% w/w aluminium oxide. In one embodiment, the slag comprises from approximately 10% to approximately 25% w/w aluminium oxide. In certain embodiments, slag comprises approximately 10%, 15%, 20%, 25% w/w aluminium oxide. In one particular embodiment, the slag comprises from approximately 10% to approximately 20% w/w aluminium oxide. In one embodiment, the slag comprises approximately 10%, 11%, 12%, 13%, 14%, 15%, 16%, 17%, 18%, 19% or 20% aluminium oxide.

In another embodiment, the titanium-bearing material is an ore and comprises from at least approximately 0% (or at least approximately 1%) to at least approximately 15% aluminium oxide. In one embodiment, the ore comprises from approximately 0% (or approximately 1%) to approximately 15% aluminium oxide. In one embodiment, the ore comprises from at least approximately 1% to at least approximately 10% aluminium oxide. In one embodiment, the ore comprises from approximately 1% to approximately 10% aluminium oxide. In certain embodiments, the ore comprises approximately 1%, 2%, 3%, 4%, 5%, 6%, 7%, 8%, 9% or 10% w/w aluminium oxide.

In another embodiment, the titanium-bearing material is an ore concentrate and comprises from at least approximately 1% to at least approximately 10% aluminium oxide. In one embodiment, the ore concentrate comprises from approximately 1% to approximately 10% aluminium oxide. In certain embodiments, the ore comprises approximately 1%, 2%, 3%, 4%, 5%, 6%, 7%, 8%, 9% or 10% w/w aluminium oxide. In one embodiment, the ore concentrate comprises from approximately 5% to approximately 8% aluminium oxide.

In one embodiment, the titanium-bearing material is red mud and comprises from at least approximately 10% to at least approximately 20% aluminium oxide. In one embodiment, the red mud comprises from approximately 10% to approximately 20% aluminium oxide. In certain embodiments, the red mud comprises approximately 10%, 11%, 12%, 13%, 14%, 15%, 16%, 17%, 18%, 19% or 20% aluminium oxide.

In one embodiment, the titanium-bearing material comprises from at least approximately 0% to at least approximately 60% w/w iron oxide. In one embodiment, the titanium-bearing material comprises from approximately 0% to approximately 60% w/w iron oxide. In one embodiment, the material comprises from approximately 30% to approximately 60% w/w iron oxide. In one embodiment, the titanium-bearing material comprises from approximately 0% to approximately 10% w/w iron oxide. In one embodiment, the titanium-bearing material comprises from approximately 1% to approximately 5% w/w iron oxide. In certain embodiments, the titanium-bearing material comprises approximately 1%, 2%, 3%, 4%, 5%, 6%, 7%, 8%, 9% or 10% w/w iron oxide. In other embodiments the material comprises approximately 30%, 35%, 40%, 45%, 50%, 55%, or 60% iron oxide.

In one embodiment, the titanium-bearing material is an iron making slag and comprises from at least approximately 0% to at least approximately 10% w/w iron oxide. In one embodiment, the slag comprises from approximately 0% to approximately 10% iron oxide. In one embodiment, the slag comprises from at least approximately 1% to at least approximately 5% iron oxide. In one embodiment, the slag comprises from approximately 1% to approximately 5% iron oxide. In certain embodiments, the slag comprises approximately 1%, 2%, 3%, 4%, 5% or 6% iron oxide.

In another embodiment, the titanium-bearing material is an ore or an ore concentrate and comprises from at least approximately 0% to at least approximately 10% w/w iron oxide. In one embodiment, the ore or concentrate comprises from approximately 0% to approximately 10%, or from approximately 0% to approximately 5% iron oxide. In certain embodiments, the ore or ore concentrate comprises approximately 0%, 1%, 2%, 3%, 4%, 5%, 6%, 7%, 8%, 9% or 10% iron oxide.

In one embodiment, the titanium-bearing material is red mud and comprises from at least approximately 30% to at least approximately 60% iron oxide. In one embodiment, the red mud comprises from approximately 30% to approximately 60% iron oxide. In certain embodiments, the red mud comprises approximately 30%, 35%, 40%, 45%, 50%, 55% or 60% w/w iron oxide.

In other embodiments, the titanium-bearing material further comprises vanadium oxide. In certain embodiments, the material comprises from at least approximately 0% to at least approximately 2% vanadium oxide. In one embodiment, the material comprises from approximately 0% to approximately 2% vanadium oxide. In certain embodiments, the material is an iron making slag, ore or ore concentrate and comprises from approximately 0% to approximately 1%, or from approximately 0% to approximately 0.5%, or from approximately 0.25% to 0.5% vanadium oxide. In certain embodiments, the slag, ore or ore concentrate comprises approximately 0.1%, 0.2%, 0.3%, 0.4%, 0.5%, 0.6%, 0.7%, 0.8%, 0.9% or 1% vanadium oxide.

In one embodiment, the titanium-bearing material feedstock is an iron making slag produced as a result of an iron or steel manufacturing process. An example of iron making slag constituents is provided below in Table 1, which details the constituents of melter slag produced in New Zealand by NZ Steel's steel manufacturing process. Values are determined using the X-ray fluorescence analytical technique.

TABLE 1

| NZ Steel Melter Slag | |
|---|---|
| Constituent | m % |
| $TiO_2$ | 32.1-33.3 |
| $Al_2O_3$ | 17.8-19 |
| MgO | 13.2-13.3 |
| CaO | 15.5-15.9 |
| $SiO_2$ | 12.8-15.2 |
| $Fe_2O_3$ | 2.34-3.9 |
| $V_2O_5$ | 0.2 |

Further examples of iron making slag constituents are provided in Table 14 in the "Examples" section of this document.

In a preferred embodiment, the titanium-bearing material is a slag and comprises from approximately 15% to approximately 65% titanium dioxide, approximately 5% to approximately 40% calcium oxide, approximately 5% to approximately 20% magnesium oxide, and approximately 10% to approximately 25% aluminium oxide. In one embodiment, the slag also comprises from approximately 5% to approximately 30% silica.

In one embodiment, the ratio of titanium dioxide to calcium oxide (TiO2:CaO) in the titanium-bearing material is from approximately 0.2 to approximately 3. In certain embodiments, the ratio is from approximately 0.2 to approximately 2.5 or from approximately 0.2 to approximately 2.

In one embodiment, the ratio of titanium dioxide to magnesium oxide (TiO2:MgO) in the titanium-bearing material is from approximately 0.5 to approximately 25. In another embodiment the ratio is from approximately 0.5 to approximately 18. In one embodiment, the ratio is from approximately 0.5 to approximately 10. In certain embodiments, the ratio is from approximately 0.7 or approximately 0.8 to approximately 3 or to approximately 4, or from approximately 4 to approximately 10.

In one embodiment, the ratio of titanium dioxide to aluminium oxide (TiO2:Al2O3) in the titanium-bearing material is from approximately 0.2 to approximately 21. In another embodiment, the ratio is from approximately 0.2 to approximately 6. In another embodiment, the ratio is approximately 0.2 to approximately 2.6. In one embodiment, the ratio is from approximately 0.5 to approximately 2.5. In another embodiment, the ratio is from approximately 1 to approximately 5.

In a preferred embodiment, the titanium-bearing material is a slag and comprises a ratio of titanium dioxide to aluminium oxide of from approximately 0.5 to approximately 2.5, a ratio of titanium dioxide to calcium oxide of from approximately 0.2 to approximately 2.5, and a titanium dioxide to magnesium oxide ratio of from approximately 0.7 to approximately 4. In a preferred embodiment, the titanium-bearing material is a slag (for example, an iron making slag or VTM slag).

The titanium-bearing material feedstock for the methods of the invention may be used in any suitable form, and/or may be processed from its original state in one or more ways before being fed to a method of the invention, as will be appreciated by persons of ordinary skill in the art. By way of example only, a titanium-bearing material may be subjected to a beneficiation process to remove or reduce dirt or clay or one or more unwanted compounds for example, concentrated or processed to a particulate form prior to being fed to a method of the invention. In a preferred embodiment, the titanium-bearing material is in particulate form. The particulate material may be prepared accordingly to known methods, such as grinding.

In particular embodiments, the material is in the form of a particulate material having a particle size sufficient to permit contact of the sulfuric acid with each species of metal oxide within the titanium-bearing material which is to be recovered as a product in a method of the invention. In one embodiment, the particular material has an average particle size of less than 180 μm. In preferred embodiments, the particulate material has an average particle size from 10 to 180 μm, or from 40 to 110 μm. In particular embodiments, the particulate material has an average particle size of approximately 30 μm, 45 μm, 60 μm, 70 μm, 80 μm, 90 μm, or 100 μm. In one embodiment, the titanium-bearing material is processed to have a target size of D90 approximately <250 microns.

In certain embodiments, the method of the invention further comprises the step of grinding the titanium-bearing material prior to step a) of the process of the first or second aspects. Those of ordinary skill in the art will readily appreciate means to grind the titanium-bearing material and to measure particle size. However, by way of example, grinding may occur using a ball mill and/or particle size measured using laser diffraction.

Metal Sulphation

In one embodiment the titanium-bearing material and a desired amount of sulfuric acid are combined to form a sulphated mixture in a sulfation reaction. For example, the material is introduced to an appropriate reactor where it is combined with the sulphuric acid. The conditions are such to convert oxides present in the feedstock to sulfates, in the following reactions, for example:

$$Al_2O_3 + 3H_2SO_4 \rightarrow Al_2(SO_4)_3 + 3H_2O$$

$$MgO + H_2SO_4 \rightarrow MgSO_4 + H_2O$$

$$TiO_2 + H_2SO_4 \rightarrow TiOSO_4 + H_2O$$

$$Fe_2O_3 + 3H_2SO_4 \rightarrow Fe_2(SO_4)_3 + 3H_2O$$

$$CaO + H_2SO_4 \rightarrow CaSO_4 + H_2O$$

Any Si present does not react

In one embodiment, water is added to initiate an exothermic reaction and on addition of water, the temperature in the reactor rises to approximately 100 degrees C. or above. In one embodiment, external heating may also be applied. External heating may be applied using any known means. However, by way of example, addition of heated air or steam, the use of a jacketed reactor with heated thermal fluid or a jacketed reactor with steam, indirect infrared heating or contact electrical heat tracing.

In another embodiment, for example where the sulfation step is run continuously, the titanium-bearing material is pre-mixed with the desired amount of sulfuric acid and the mixture fed to a reactor. In one embodiment, the material is pre-mixed with the desired amount of sulfuric acid and water is added and then the mixture is fed to a reactor. In one embodiment, the reactor is preheated. The reactor may be heated using any known means, including those exemplified in the immediately preceding paragraph. In one embodiment, the reactor is preheated to approximately 100 degrees C. In another embodiment, for example where the process is continuous or semi-continuous, the reactor is operating at the desired sulfation temperature.

While a variety of sulfation conditions may be used in this step of the methods of the invention to convert oxides present in the titanium-bearing material to sulfates, the inventors have found that the use of the specific conditions outlined herein and in particular, combinations of these specific conditions, allows for efficient recovery of titanium dioxide, particularly pigment-grade titanium dioxide, from the titanium-bearing feedstock materials. In particular, the inventors believe that these conditions have the advantage of improving the quality of the leach liquor produced in the leaching step and as a result the efficiency of the subsequent titanium dioxide hydrolysis step. The inventors believe that these conditions are particularly suited to feedstock materials which may be low in titanium dioxide, for example slags.

The reaction is preferably conducted at atmospheric pressure and external heat applied so that the sulphated mixture reaches a temperature of from approximately 130 degrees C. to approximately 250 degrees C. In one embodiment, the temperature is from approximately 130 to approximately 220 degrees C. In a preferred embodiment the temperature is from approximately 170 or approximately 180 to approximately 210 degrees C. In one preferred embodiment, the temperature is below approximately 210 degrees C.

The reaction is allowed to continue for a time sufficient to convert a desired amount of the oxides present in the feedstock to sulphates. In one embodiment, the reaction is run for a period of time long enough to allow at least approximately 70%, 75%, 80% or at least approximately 85% or approximately 90% of the oxides in the slag to be converted to sulphates.

In one embodiment, the reaction is conducted (ie mix held at temperature), or the sulfated mixture is contained within the reactor, for a period of from approximately 30 minutes to approximately 4 hours. In particular embodiments, the reaction is conducted for a period of from approximately 30 minutes to approximately 4 hours. In one preferred embodiment, the reaction is conducted for a period of up to approximately 3 hours, for example from approximately 30 minutes to approximately 3 hours. In another preferred embodiment, the reaction is conducted for up to approximately 2 hours, for example from approximately 30 minutes to approximately 2 hours, approximately 30 minutes to approximately 90 minutes, or approximately 30 minutes to approximately 1 hour. In another preferred embodiment, the reaction is conducted for less than approximately 2 hours. In certain preferred embodiments, the reaction time is approximately 30 minutes, approximately 45 minutes, approximately 60 minutes, approximately 75 minutes, approximately 90 minutes, approximately 105 minutes or approximately 2 hours. In another embodiments, the reaction time is approximately 3 hours or approximately 4 hours.

In a particularly preferred embodiment of the invention, the reactor is a continuous reactor. Any suitable continuous reactor may be used in the invention. However, as the reaction reaches completion, the sulfates solidify in the reactor and so the continuous reactor is preferably adapted to convert the solid reaction product to a particulate or powdered sulfate cake which can move in the reactor. In one preferred embodiment, a pug mill or a reactor which is adapted for continuous blending may be used. In a preferred embodiment, the feed materials are continuously added to the reactor and reacted cake is also removed continuously at a rate allowing for an appropriate reaction time. In one embodiment, the reaction time is as described in the previous paragraph, preferably for a period of up to three hours, more preferably up to approximately 2 hours or less than two hours.

The concentration of sulfuric acid used in the sulfation reaction is preferably from at least approximately 60%, 65%, 70%, 75%, 80%, 85% 90%, 95%, or at least approximately 98%. In preferred embodiments, the concentration of the sulfuric acid used is from approximately 75% to approximately 98%, more preferably approximately 80% to approximately 95% or approximately 80% to approximately 90%.

The ratio of sulfuric acid to titanium-bearing material used in the sulfation reaction is preferably from approximately 0.75:1 to approximately 2:1. In one embodiment, the ratio is above approximately 1.3:1. In preferred embodiments, the ratio of sulfuric acid to titanium-bearing material is from approximately 1.3:1 to approximately 1.7:1, for example approximately 1.3:1, approximately 1.4:1, approximately 1.5:1, approximately 1.6:1 to approximately 1.7:1.

In preferred embodiments, the reaction is conducted at a temperature from approximately 170 to approximately 210 degrees C. using approximately 75% to approximately 98% (preferably approximately 80% to approximately 95% or approximately 80% to approximately 90%, for example, 75, 80, 85, 90, or 95%) sulfuric acid. The reaction is preferably conducted for a period of up to approximately 3 hours (or up to or less than approximately 2 hours—for example, approximately 30, approximately 45, approximately 60, approximately 75, approximately 90, approximately 105). The ratio of sulfuric acid to titanium-bearing material used is preferably from approximately 0.75:1 to 2:1 (more preferably, above approximately 1.3:1, or from approximately 1.3:1 to 1.7:1, for example 1.4:1, 1.5:1, 1.6:1 or 1.7:1). In these preferred embodiments, the reactor used is preferably a one which is adapted to convert solid reaction product to a particulate or powdered sulfate cake. In a preferred embodiment, the titanium-bearing material is a slag, more preferably an iron making slag or a VTM-slag.

In certain embodiments, at least a proportion of the sulfuric acid used in a method of the invention is generated by a sulfur burner which is co-located at the site at which a process of the invention is performed. For example, any sulfur off-gas produced from the sulfation step of a process of the invention may be captured and fed to a sulfur burner to generate sulfuric acid which can be fed back to the sulfation step. The sulfur burner will also produce heat and energy which could also be utilised in one or more steps of a process of the invention to reduce external energy requirements. In addition, steam generated may be used for heating needs in a process of the invention or in jet milling of titanium dioxide recovered in a process of the invention. The integration of a sulfur burner in one or more of these ways may assist in reducing the carbon footprint of the overall process.

Leaching

The powdered sulfate cake from the sulfation reaction is subjected to a leaching step to extract at least the sulphate species from the cake.

In one embodiment, a leaching step comprises mixing the cake with water to form a sulfated suspension. In a preferred embodiment, this step may also involve the addition of some sulphuric acid to the water:cake mixture to avoid premature hydrolysis of TiO2. Accordingly, in an alternative embodiment, this step comprises mixing the cake with dilute sulfuric acid to form a sulfated suspension.

In one embodiment, an agent, such as iron or aluminium, is added to the mixture to decrease the Oxidation-Reduction Potential (ORP) in the liquor. In one embodiment, the ORP is decreased to approximately −50 mV to approximately −250 mV, for example approximately −100 mV. In another embodiment, the ORP is decreased from a positive value to zero or below. In another embodiment, where a process of the invention is conducted at a site co-located with a facility (such as an iron making or steel manufacturing plant) having a coke oven, reducing gases from the coke oven could be fed to the leach and bubbled through the leach mixture, instead of or in addition to using agents such as iron or aluminium as reducing agents. Integrating a coke oven in this way may assist in reducing the carbon footprint of the overall process.

The leaching step may be conducted at any appropriate temperature. However, in a preferred embodiment it is conducted at from approximately 30 degrees C. to approximately 95 degrees C. In one embodiment, it is conducted at from approximately 30 degrees C. to approximately 80 degrees C. In certain embodiments, it is conducted at approximately 35, 40, 45, 50, 55, 60, 65, 70, 75, 80, 85, 90, or 95 degrees C.

Water is preferably mixed with the cake in a ratio of from approximately 0.75:1 to approximately 2:1, for example, approximately 1:1. Where dilute sulfuric acid is used it is used at a concentration of from approximately 0.05 or approximately 0.1% to approximately 15% of the liquid used to leach the cake. In one embodiment, sulfuric acid is used at a concentration of from approximately 0.1% to approximately 15% of the liquid used to leach the cake. In other embodiments, a concentration of from approximately 0.5% to approximately 15%, from approximately 5% to approximately 15%, or from approximately 5% to approximately 10% is used. In one embodiment, where dilute sulfuric acid is used, the pH of the liquid used to leach the cake is approximately 2 or lower.

The leaching step is performed for a sufficient time to allow for a desired level of extraction of the sulphate species from the cake. In one embodiment, leaching is performed for a sufficient time to allow at least approximately 70%, 75%, 80%, 85%, 90%, or 95% of the sulphate species are extracted from the cake. In a preferred embodiment, at least approximately 90% of the sulphate species are extracted. In certain embodiments, leaching is performed for a period of from approximately 30 minutes to approximately 4 hours. In one embodiment, the leaching is performed for approximately 30 minutes, 1 hour, 2 hours, 3 hours or 4 hours.

Leaching may be conducted in any suitable vessel as will be readily appreciated by those of skill in the art.

Sulphate species (including, for example, titanyl sulfate, magnesium sulfate, aluminium sulfate) present in the titanium-bearing material will dissolve during leaching, except for CaSO4, SiO2 and any other unreacted oxides.

In one embodiment, the permeate (eg liquor) resulting from the leach step of a method of the invention comprises the titanium equivalent of approximately 120 g or less of titanium dioxide/L of permeate, for example from approximately 30 to approximately 120 g of titanium dioxide/L of the permeate, from approximately 40 to approximately 110 g of titanium dioxide/L of permeate, or from approximately 50 to approximately 100 g of titanium dioxide/L of permeate. In other embodiments, the composition comprises approximately 100 g or less of titanium dioxide/L of permeate, for example approximately 95, 90, 85, 80, 75, 70, 65 or 60 g/L or less of titanium dioxide/L of the permeate. In one embodiment, the feedstock used in these embodiments is a slag, preferably an iron making slag or a VTM slag.

Separation of First Permeate and First Retentate

The sulphated suspension is subjected to a separation step to separate dissolved sulphate species (for example, titanyl sulfate, magnesium sulfate, aluminium sulfate) from undissolved compounds (ie to separate solids from liquid). Filtration is preferred however other methods may be used. Separation results in a first permeate comprising at least titanyl sulfate (and preferably magnesium sulfate and aluminium sulfate) and a first retentate comprising at least CaSO4 and $SiO_2$. The first retentate may comprise other unreacted oxides (such as silicates) as a result of being encapsulated by a refractory material or due to incomplete reaction of the feed material.

Filtering of the sulphated mixture may occur using any suitable filtration means, as will be known to persons skilled in the art. However, by way of example, the filtration means may comprise a filter and a filter press. In one embodiment, the filtration unit is assisted by a differential pressure gradient across the filter. Preferably, the pressure differential is at least 1 bar. In particular embodiments, the mixture is circulated through a filtration unit which permits liquids to pass through, while a solid is collected on the surface of the filter. In particular embodiments, the pressure differential across the filter is from 2 to 10 bar. Preferably, the pressure differential is approximately 6 bar. In other examples, the filtering may comprise: thickening followed by drum filtration; centrifugation; and vacuum belt filtration. A filter aid, such as Perlite, for example, may be used to facilitate filtration.

The separation step is conducted for a sufficient time to allow for substantial separation of the first permeate and first retentate. However, in certain embodiments the separation step is conducted for a period from approximately 15 minutes to approximately 3 hours, for example for approximately 15 mins, 30 mins, 45 mins, 1 hour, 2 hours or 3 hours.

The separation step is conducted at a temperature above the freezing point of the metal salts in the liquor.

Calcium Sulphate/Silica Recovery

The titanium-bearing material which is the feedstock for the methods of the invention contains perovskite. Such feedstocks include an amount of silica and calcium oxide. These components are relatively low value and are often viewed as problematic waste products that contaminate compositions containing higher value materials such as titanium dioxide. However, through extensive trials, the inventors have found that these components can be extracted in the form as silica and separately calcium sulphate. Both products have use in industry. The inventors have found that sulphation of the calcium oxide and removal as an insoluble residue prior to titanium sulphate hydrolysis provides a particularly efficient and cost-effective method of recovery of these components. In addition, removal of the insoluble residue comprising silica and calcium sulphate allows for improved purity of the recovered titanium dioxide, and any aluminium sulphate and magnesium sulphate present, in any later method steps. Overall, these steps and their order contribute to providing an inventive, cost-effective and industrially efficient methods of recovering said products with minimal waste.

In methods of the invention, the first retentate may be recovered for future use in this form (ie a combination of silica and calcium sulphate and any other compounds that may be present) or further processed. For example, in one embodiment, the first retentate comprising calcium sulfate and silica is preferably washed with a mixture of water and a compound which can at least partially and preferably substantially neutralise any acid present. In one embodiment, the compound is CaO or Ca(OH)2. A second filtration step is then conducted to form a CaSO4:SiO-rich solid.

In another embodiment, calcium sulphate and/or silica may be recovered separately from the first retentate or the CaSO4:SiO-rich solid using one or more further processing steps.

After recovery, the first retentate, calcium sulphate and/or silica may be further processed using standard methods, having regard to its intended use. However, by way of example the product may be washed or reslurried (or repulped) and refiltered. By way of further example, it may be dried.

Titanyl Sulphate Hydrolysis

Hydrolysis of titanyl sulphate present in the first permeate (or first liquor) occurs by the following reaction: $TiOSO_4 + H_2O \rightarrow TiO_2 + H_2SO_4$. The oxide form of titanium can then be separated from other species present in the composition in which it resides (eg the first permeate (first aspect of the invention) or liquor (second aspect of the invention).

Hydrolysis may occur by the Mecklenburg process or the Blumenfeld process as will be known to persons skilled in the art. However, by way of example the processes are described in U.S. Pat. Nos. 1,758,528 and 1,795,467, respectively.

In one embodiment, using the Blumenfeld method, the composition comprising titanyl sulfate (for example, the first permeate (first aspect of the invention) or liquor (second aspect of the invention)) is contacted with water to form another composition (for example the first liquor (first aspect of the invention) or a second liquor (second aspect of the invention)) comprising titanium dioxide hydrate. In this embodiment, water may be used in any appropriate volume to allow for a desired or sufficient amount of hydrolysis to occur.

In a preferred embodiment the Mecklenburg process is used, and the hydrolysis reaction occurs via contacting the first permeate or first liquor with TiO2 nuclei. The titanium dioxide particles act as nucleating sites for crystallization, so as to achieve uniform particle formation. Persons skilled in the art will readily appreciate nuclei of use in the invention and methods for their production, particularly having regard to the Mecklenburg process referred to herein. However, in one embodiment, the TiO2 nuclei may be anatase or rutile. In another embodiment, there is a mix of anatase and rutile seeds. Preferably, the particle size of the TiO2 nuclei are from 2 nm to 10 nm, more preferably 3 to 6 nm or approximately 5 nm.

In a preferred embodiment, the TiO2 nuclei are suspended in water and the mixture of nuclei and water is contacted with the composition comprising titanyl sulfate (for example first permeate (first aspect of the invention) or the first liquor (second aspect of the invention). The TiO2 nuclei:water mix may contain any appropriate concentration of TiO2 nuclei as would be understood by a person skilled in the art.

The volume of TiO2 nuclei and/or water added to the composition comprising titanyl sulfate (eg first permeate (first aspect of the invention) or first liquor (second aspect of the invention) may vary. However, in one embodiment, the volume used is calculated based on the predicted amount of TiO2 produced by the hydrolysis reaction.

The hydrolysis reaction preferably takes place at elevated temperature and at atmospheric pressure. In certain embodiments, the first liquor is heated to a hydrolysis reaction temperature of from approximately 75 to approximately 120 degrees C., from approximately 80 to approximately 120 degrees C., from approximately 85 to approximately 110 degrees C., from approximately 90 to approximately 110 degrees C., from approximately 90 to approximately 105 degrees C.

The reaction temperature is maintained for a period of time sufficient to allow for a desired yield of TiO2 formation. In one particular embodiment, the reaction temperature is maintained for a period of time to allow for at least approximately 70%, at least approximately 80%, at least approximately 85%, at least approximately 90% or at least approximately 95% yield of TiO2 from TiOSO4. In one embodiment, the temperature is maintained for a period of time to allow for substantially complete hydrolysis of TiOSO4 to TiO2. In other embodiments, the temperature is maintained for a period sufficient to allow for approximately 70%, 75%, 80%, 85%, 90%, or 95% hydrolysis. Persons skilled in the art will be able to determine the yield of TiO2 using standard procedures. In certain embodiments, reaction temperature is preferably maintained for a period of from approximately 60 minutes to approximately 3 hours, from approximately 90 minutes to approximately 3 hours, from approximately 90 minutes to approximately 2 hours, approximately 60 minutes, approximately 100 minutes, approximately 2 hours or approximately 3 hours.

The hydrolysis reaction can take place in any appropriate vessel known by persons skilled in the art. However, by way of example it is a tank. By way of example, the first permeate (first aspect of the invention) or first liquor (second aspect of the invention) will be fed from the leaching step to a hydrolysis tank. The temperature of the first permeate or first liquor will then be raised to a desired temperature, TiO2 nucleic, water and/or TiO2 nuclei:water mix will be added to the first permeate (first aspect of the invention) or first liquor (second aspect of the invention) to form a first liquor or second liquor (respectively), the temperature will then be raised to the hydrolysis temperature and the temperature will be held at that temperature for a period of time sufficient for a desired amount of titanyl sulfate to be converted to hydrated TiO2.

In one embodiment, the composition (a leach liquor, for example, the first permeate or the first liquor) used in this step of a method of the invention comprises the titanium equivalent of approximately 120 g or less of titanium dioxide/L of composition, for example from approximately 30 to approximately 120 g of titanium dioxide/L of the composition, from approximately 40 to approximately 110 g of titanium dioxide/L of composition, or from approximately 50 to approximately 100 g of titanium dioxide/L of composition. In other embodiments, the composition comprises approximately 100 g or less of titanium dioxide/L of composition, for example approximately 95, 90, 85, 80, 75, 70, 65 or 60 g/L or less of titanium dioxide/L of the composition. In one embodiment, the feedstock used in these embodiments is a slag, preferably an iron making slag or a VTM slag.

Separation of Hydrated Titanium Dioxide from a Liquor

Separation of the hydrated titanium dioxide from a composition in which it resides (for example, the first liquor) may be achieved by any one of a number of methods known to those of skill in the art. In particular embodiments, separation is carried out in a separation unit adapted to receive the composition (for example, the first liquor or in other embodiments the second liquor) and separate titanium dioxide hydrate.

In particular embodiments, the separation unit comprises a filtration unit adapted to receive a liquor and produce a retentate comprising titanium dioxide hydrate and a permeate comprising one or more of aluminium sulfate, magnesium sulfate, and other metal sulfates. In alternative embodiments the separation unit comprises a centrifugation unit adapted to separate the titanium dioxide hydrate.

In certain embodiments, the separated hydrated titanium dioxide may then be washed prior to further processing. The inventors contemplate that a washing step removes any soluble material and excess unbound acid from the $TiO_2 \cdot H_2O \cdot H_2SO_4$ species.

In one embodiment of the invention, the hydrated titanium dioxide separated may optionally be bleached. This may occur in any appropriate vessel as will be known to those skilled in the art. Following bleaching the TiO2 hydrate may be then filtered and washed, with water for example.

TiO2 hydrate produced in a method of the invention may be used as a feedstock for a titanium dioxide pigment manufacturing process.

TiO2 Calcining

The titanium dioxide recovered from the hydrolysis reaction may be calcined (heated) in an oxidative environment, which removes any residual sulphuric acid and water.

Calcining may occur in any appropriate apparatus as will be known to those of skill in the art. Typically calcining will involve passing heated air through the product in the relevant apparatus.

The temperature and heating period may be of any amount and time sufficient to remove a desired level of sulfuric acid and water from the hydrated TiO2. In preferred embodiments, the titanium dioxide is heated to a temperature of from approximately 800 to approximately 1100 degrees C., approximately 800 to approximately 1050, approximately 850 to approximately 1050, from approximately 900 to approximately 1000, or from approximately 800 to approximately 900 degrees C., in an appropriate reactor. In certain embodiments, the temperature is approximately 800, 810, 820, 830, 840, 850, 860, 870, 880, or 900 degrees C. In certain embodiments, the heating period is from approximately 30 minutes to approximately 4 hours. In preferred embodiments, the heating period is from approximately 30 minutes to approximately 2 hours, from approximately 45 minutes to approximately 1 hour 45 minutes, from approximately 1 hour to approximately 1 hour 30 minutes.

In certain embodiments, the TiO2 hydrate is calcined in the presence of one or more dopants. In one embodiment, doping is performed as the TiO2 is passing through a calciner bed. Any one or more appropriate dopants may be used. However, in certain embodiments, magnesium, phosphorus, zinc, aluminium and/or potassium may be used.

Following calcining, the titanium dioxide product may be further processed or finished to a desired specification for its intended final use. Such finishing steps will be readily appreciated by persons of skill in the art to which the invention relates. However, by way of example, the calcined titanium dioxide may be milled, coated and washed. In certain embodiments, finishing the product will comprise dry milling, wet milling, coating treatment, filtration, drying and micronizing using standard equipment known in the art.

Calcined titanium dioxide produced in a method of the invention may be used as a feedstock for a titanium dioxide pigment manufacturing process.

Aluminium Sulphate Recovery

Aluminium sulphate is recovered from the methods of the invention at an appropriate stage. In one embodiment, the aluminium sulphate is precipitated and separated from the second liquor (or post titanium hydrolysis liquor (PHL)) following hydrolysis of titanyl sulfate to TiO2 hydrate. In another embodiment, the aluminium sulphate is precipitated and separated from the first permeate prior to hydrolysis of titanyl sulfate to TiO2 hydrate.

The inventors have found that a higher yield of titanium dioxide can be achieved by carrying out aluminium sulphate precipitation after hydrolysis and titanium dioxide removal. It is believed that if aluminium sulphate precipitation is carried out before hydrolysis, some titanyl sulphate is lost with the aluminium sulphate thus reducing $TiO_2$ yield, although this is still a viable option in the context of the current invention. In addition, the inventors have found that the increased acidity in the post hydrolysis liquor (PHL) following titanium hydrolysis assists in aluminium sulfate recovery. If aluminium sulfate is recovered first, there can be process advantages such as not having to keep the leach liquor heated to prevent freezing of the liquor due to the high metal salt content.

Aluminium sulphate may be recovered from the processes of the invention using any appropriate methodology as will be understood in the art. However, by way of example, it may be precipitated and then separated from the liquor which remains (for example, in one embodiment the post aluminium liquor (PAL) or in another embodiment the first liquor). In certain embodiments, precipitation may occur by cooling to a temperature at which aluminium sulphate precipitates. In one embodiment, the composition comprising aluminium sulfate is heated to a temperature at which the aluminium sulfate is soluble and then cooled to precipitate and recover the aluminium sulfate in the composition. By way of example it may be precipitated by cooling to from approximately 4 degrees C. and approximately 10 degrees C., preferably approximately 5 degrees C. In another embodiment, precipitation occurs at ambient temperature (for example, from approximately 15 degrees C. to approximately 30 degrees C., for example at approximately 25 degrees C.). In one embodiment, the temperature is gradually reduced over time to the chosen temperature (for example, 25 degrees C.) to precipitate the aluminium sulfate.

In another embodiment, evaporative crystallisation may be employed; for example, using vacuum concentration. In one embodiment, a combination of concentration of the liquor and precipitation by cooling may be employed; for example, as detailed in the Examples section of this document.

In certain embodiments, this step may be seeded with aluminium sulfate seeds. This may assist with the filterability of the resulting slurry and thus the separation of precipitated aluminium sulfate. Skilled persons will readily appreciate aluminium sulfate seeds of use in the invention. However, by way of example, the seeds may be aluminium sulfate originally crystallised from a pure aluminium sulfate and sulfuric acid solution, or aluminium sulfate obtained in a process of the invention and recycled back to this step. In a preferred embodiment, the reaction is seeded with approximately 2% to approximately 20% of the anticipated aluminium sulfate yield.

Separation of precipitated aluminium sulphate may occur by any of a number of known methods. However, by way of example it may include filtration, centrifugation, sedimentation, and/or settling. In a preferred embodiment, filtration is used; for example, belt filtration.

In certain embodiments, at least approximately 70%, 75%, 80%, 85%, 90% or 95% of the aluminium sulphate is recovered from the composition (for example, second liquor (or post titanium hydrolysis liquor (PHL)) following hydrolysis of titanyl sulfate to TiO2 hydrate, or the first permeate prior to hydrolysis of titanyl sulfate to TiO2 hydrate) in the methods of the invention.

After recovery, the aluminium sulphate may be further processed using standard methods, having regard to its intended use. However, by way of example it may be washed and/or dried.

In certain embodiments, the aluminium sulphate formed in this step comprises $Al_2(SO_4)_3 \cdot XH_2O$ (where X is approximately 14 to 18, preferably 18).

Free Acid Neutralisation and Calcium sulphate recovery

In one embodiment of the invention calcium carbonate (CaCO3) is combined with the third liquor (PAL) to produce a first composition (PAL') which comprises calcium sulfate and other metal sulfates (including magnesium sulfate).

The calcium carbonate is preferably added to the liquor in any amount sufficient to raise the pH in the liquor to at least partially neutralise any sulfuric acid present. In a preferred embodiment, the calcium carbonate is added to raise the pH to a pH from approximately 1 to approximately 4. In certain embodiments, calcium carbonate is added to raise the pH to approximately 1, approximately 2, approximately 3, or approximately 4. The calcium sulphate formed in this step is preferably CaSO4·2H2O.

The neutralisation step may be conducted for any appropriate time or temperature to achieve the desired neutralisation as will be appreciated by persons skilled in the art. However, in one embodiment, the temperature is maintained below the boiling point of the composition (for example, the third liquor (PAL)). In certain embodiments, the temperature may be maintained at or below approximately 85 degrees C. or at or below approximately 80 degrees C. during neutralisation, at or below approximately 60 degrees C. or at or below approximately 40 degrees C. In one embodiment, the neutralisation step is conducted at room or ambient temperature (for example, approximately 15 to approximately 30 degrees C., for example approximately 25 degrees C.).

Calcium sulphate may be recovered from the first composition using any appropriate methodology as will be understood in the art. The addition of calcium carbonate to the liquor and resultant pH will result in a calcium sulphate precipitate which can subsequently be separated from the composition in which it remains. Separation of the precipitate may occur by any of a number of known methods. However, by way of example it may include filtration, centrifugation, sedimentation, and/or settling. In a preferred embodiment, filtration is used, for example belt filtration or filtration using a filter press After recovery, the calcium sulphate may be further processed using standard methods, having regard to its intended use. However, by way of example it may be washed and/or dried.

Figure 3:
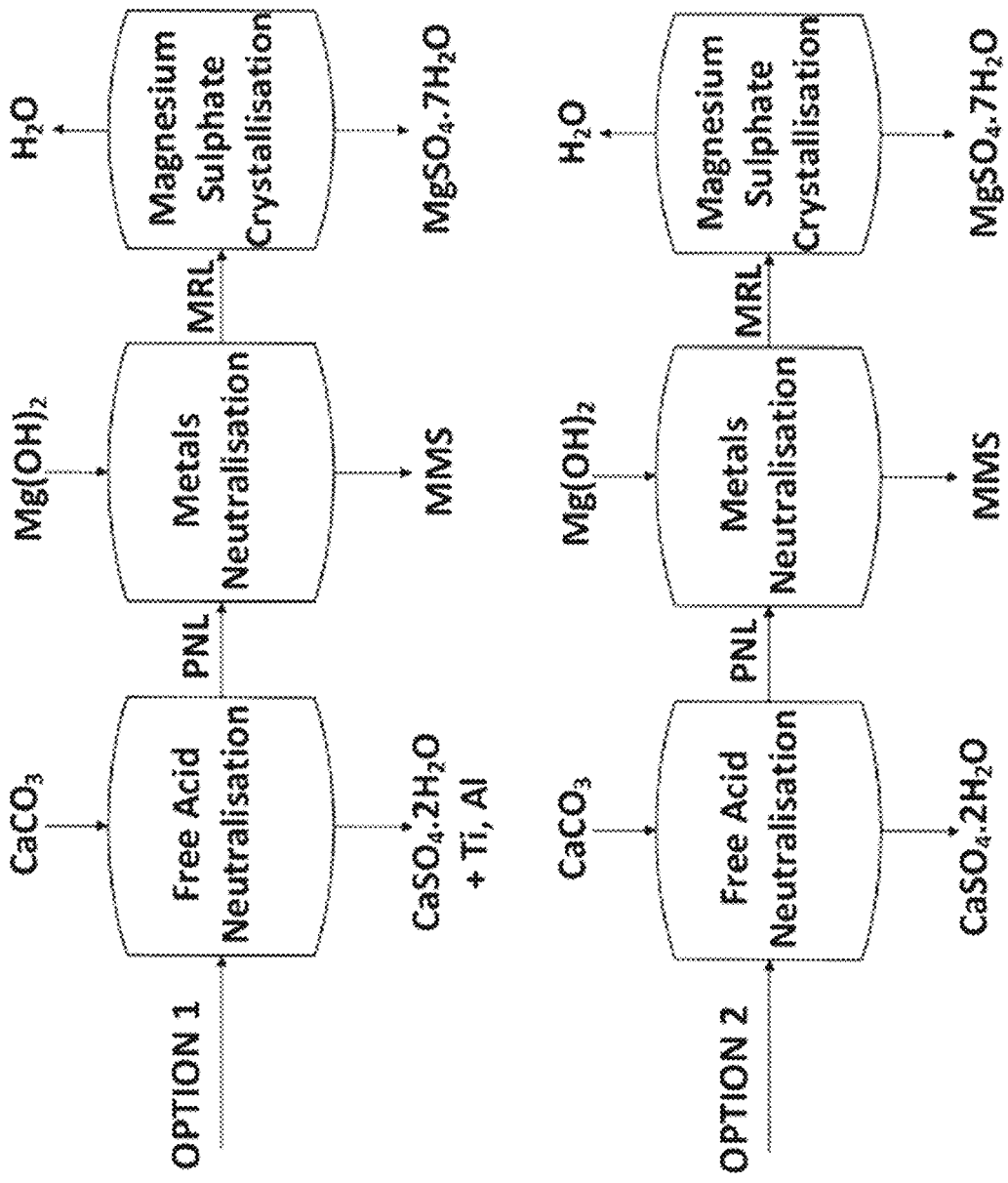
FIG. 3 shows a process flow diagram depicting two alternatives embodiments of a process according to one aspect of the invention.

In a preferred embodiment of the invention, this step is conducted under conditions so that titanium will be in the $Ti^{4+}$ state and iron will be in the of $Fe^{2+}$ state. In one embodiment, the ORP of the step is controlled or adjusted. In one embodiment, the ORP is from approximately 200 mV to approximately 300 mV, for example, approximately 270 mV. This embodiment will help increase the recovery of any titanium present in the first composition produced in the free acid neutralisation step with calcium sulfate and help ensure any iron present reports to the mixed metal solids recovered in the methods of the invention. It may also increase the level of recovery of any aluminium present with the calcium sulfate from the first composition and reduce the amount of aluminium reporting to any subsequent recovery step. Skilled persons will readily appreciate methods to determine the ORP. In this embodiment, the titanium and/or aluminium will be recovered with the calcium sulfate in the form of one or more titanium and aluminium oxides and/or hydroxides. This embodiment is shown in FIG. 3 (Option 1).

While the methods of the invention may be performed without testing, adjusting and/or controlling conditions to ensure titanium will be in the in the $Ti^{4+}$ state and iron will be in the of $Fe^{2+}$ state (for example by adjusting or controlling ORP), the inventors note that conducting the methods in accordance with this embodiment is advantageous as it can reduce waste and improve the utilisation of products produced by the methods and the overall economic efficiency of the processes. For example, conducting a method in this way can reduce the total amount of mixed metal solids produced, which is considered a lower value product relative to other products produced in the methods of the invention. While the calcium sulfate comprises an amount of aluminium and titanium, it is at a low enough level that it may still be sold (to the building industry, for example) as an alternative to other gypsum sources.

This embodiment (adjusting or controlling conditions so that titanium will be in the in the $Ti^{4+}$ state and iron will be in the of $Fe^{2+}$ state) of the free acid neutralisation step is preferably performed in combination with the embodiment of the later metals neutralisation step which uses Mg(OH)2 as opposed to Ca(OH)2, however, it could be used with either.

In one embodiment, the free acid neutralisation step conditions are adjusted or controlled to achieve the desired ORP. Persons skilled in the art will readily appreciate methods to do this. However, by way of example, in one embodiment, the step is conducted under oxidising conditions. The "oxidising conditions" can include using a calcium carbonate (CaCO3) composition which has been oxidised prior to combining it with the third liquor (PAL) or using a third liquor which has been oxidised prior to combining with calcium carbonate or oxidising once the calcium carbonate and third liquor have been combined. Oxidation may occur by any appropriate means, for example, by bubbling air through a composition or liquor, to achieve the relevant oxidation potential. The oxidation may be performed at any appropriate temperature, however, by way of example it may be performed at ambient temperature (for example from approximately 15 to approximately 30 degrees C.), or heated to approximately 45 or approximately 50 degrees C.

Calcium sulphate (including titanium and aluminium) may be recovered from the first composition using any appropriate methodology as herein before described. Similarly, the calcium sulfate (including titanium and aluminium) may be further processed using standard methods as described herein before.

Magnesium Sulphate Recovery

Magnesium sulphate is recovered from the methods of the invention at an appropriate stage. The inventors have found that it is preferable to recover magnesium sulphate at least after recovery of titanium dioxide and aluminium because the purity of the resultant magnesium sulphate precipitate is increased if conducted in this order. This is because under conditions appropriate to precipitate magnesium sulphate, aluminium sulphate and titanyl sulphate would also co-precipitate and it would be difficult and uneconomical to have to subsequently separate substantially pure compounds. The yield of titanium dioxide and aluminium sulphate may be compromised.

In one embodiment, the magnesium sulphate is recovered in the processes of the invention (for example, from the fourth liquor (or post neutralisation liquor (PNL) in the first aspect) before mixed metal solids are recovered in the process. The inventors have found there to be economic advantages to conducting the steps in this order. In a particularly preferred embodiment, the magnesium sulphate is recovered (for example, from the fifth liquor (or post mixed metal liquor) in the second aspect) after mixed metal solids are recovered in the process. The inventors have found that by recovering magnesium sulfate after MMS a higher purity of magnesium sulfate is achieved, with a concomitant increase in its value. For example, in certain embodiments, contaminants, such as manganese which may otherwise present in the magnesium sulfate recovered from such processes, are reduced or substantially eliminated. This may have the benefit of improving the potential utility of recovered magnesium sulfate in the agricultural industry, particularly where the feedstock used is high in manganese.

Magnesium sulphate may be recovered from the processes of the invention using any appropriate methodology as will be understood in the art. However, by way of example, it may be precipitated and then separated from the liquor or composition in which it remains (for example, in one embodiment the fifth liquor (or MRL) or in another embodiment the fourth liquor (PML)). In one embodiment, precipitation may occur by cooling to a temperature at which magnesium sulphate precipitates. By way of example it may be precipitated by cooling to approximately 4 degrees C. or less, or from approximately 0 degrees C. to approximately 4 degrees C., preferably approximately 3 degrees C. In a preferred embodiment, evaporative crystallisation is be employed; for example, using vacuum concentration. In one embodiment, evaporative crystallisation is performed at a temperature of less than approximately 50 degrees C.

Separation or recovery of magnesium sulphate may occur by any of a number of known methods. However, by way of example it may include filtration, centrifugation, sedimentation, and/or settling. In a preferred embodiment, magnesium sulphate is separated using filtration, for example belt filtration.

In certain embodiments, at least approximately 75%, 80%, 85%, 90% or 95% of the magnesium sulphate is recovered from the composition or liquor feeding to this step of the methods of the invention.

After recovery, the magnesium sulphate may be further processed using standard methods, having regard to its intended use. However, by way of example it may be washed and/or dried.

The magnesium sulphate recovered in this step is preferably MgSO4·7H2O, MgSO4·6H2O and/or MgSO4·1H2O (Kieserite); by way of example, MgSO4·7H2O or ·6H2O may be recovered and then dried to recover MgSO4·1H2O.

In one embodiment of the invention where the mixed metal solids are recovered prior to magnesium sulfate, the magnesium sulfate separated or recovered in the methods is from at least approximately 75% to approximately 90% pure, preferably at least approximately 90% pure.

Metals Neutralisation and Mixed Metal Solids and Calcium Sulphate Recovery

In one embodiment, calcium hydroxide (Ca(OH)2) is added to a relevant composition to produce a composition comprising mixed metal oxides and/or hydroxides and calcium sulfate. In one embodiment, calcium hydroxide is added to the fifth liquor (PML) to produce a second composition (PML') which comprises mixed metal oxides and/or hydroxides and calcium sulfate. In a preferred embodiment, this step takes place prior to the step of recovering magnesium sulfate in a process of the invention; for example, calcium hydroxide is added to the fourth liquor (PNL) to produce a second composition (PNL') comprising magnesium sulphate, mixed metal oxides and/or hydroxides and calcium sulfate.

The calcium hydroxide is preferably added to the relevant composition in any amount sufficient to raise the pH in the composition to at least partially neutralise any H2SO4 present in the composition. In a preferred embodiment, the calcium hydroxide is added to raise the pH to a pH from approximately 7 to approximately 10. In certain embodiments, the calcium hydroxide is added to raise the pH to approximately 7, approximately 8, approximately 9 or approximately 10. The calcium sulphate formed in this step is preferably CaSO4·2H2O.

This step may be conducted for any appropriate time or temperature to achieve the desired neutralisation as will be appreciated by persons skilled in the art. However, by way of example, the temperature is maintained below the boiling point of the composition. In certain embodiments, the temperature may be maintained at or below approximately 85 degrees C. or the temperature may be maintained at or below approximately 80 degrees C. during neutralisation, at or below approximately 60 degrees C. or at or below approximately 40 degrees C. In one embodiment, the neutralisation step is conducted at room or ambient temperature (for example, approximately 15 to approximately 30 degrees C., for example approximately 25 degrees C.).

Mixed metal solids and/or calcium sulphate may be recovered from a composition (for example the liquors PNL' and PML') using any appropriate methodology as will be understood in the art. The addition of calcium hydroxide to the liquor and resultant pH will result in mixed metal oxides and/or hydroxides and calcium sulphate precipitating which can subsequently be separated as solids from the composition in which they remain. Separation of the precipitate may occur by any of a number of known methods. However, by way of example it may include filtration, centrifugation, sedimentation, and/or settling. In a preferred embodiment, filtration is used. In a preferred embodiment, a filter press or belt filtration is used.

In a preferred embodiment, mixed metal solids and calcium sulphate are recovered as a mixture. In other embodiments, the mixed metal solids and calcium sulphate may be recovered separately. In one embodiment, the method may comprise separating the calcium sulphate from the mixed metal solids. Skilled persons will appreciate appropriate methodology for doing this.

After recovery, the mixed metal solids and/or calcium sulphate be further processed using standard methods, having regard to its intended use. However, by way of example it may be washed and/or dried.

Metals Neutralisation and Mixed Metal Solids Recovery

In one embodiment, magnesium hydroxide (Mg(OH)2) is added to a relevant composition to produce a composition comprising mixed metal oxides and/or hydroxides. In one embodiment, magnesium hydroxide (Mg(OH)2) is added to the fifth liquor (PML) to produce a second composition (PML') which comprises mixed metal oxides and/or hydroxides. In a preferred embodiment, this step takes place prior to the step of recovering magnesium sulfate in a process of the invention; for example, magnesium hydroxide is added to the fourth liquor (PNL) to produce a second composition (PNL') comprising magnesium sulphate, mixed metal oxides and/or hydroxides.

The magnesium hydroxide is preferably added to the relevant composition in any amount sufficient to raise the pH in the composition to at least partially neutralise any H2SO4 present in the composition. In a preferred embodiment, the magnesium hydroxide is added to raise the pH to a pH from approximately 7 to approximately 10. In certain embodiments, the magnesium hydroxide is added to raise the pH to approximately 7, approximately 8, approximately 9 or approximately 10.

This step may be conducted for any appropriate time or temperature to achieve the desired neutralisation as will be appreciated by persons skilled in the art. However, by way of example, the temperature is maintained below the boiling point of the composition. In certain embodiments, the temperature may be maintained at or below approximately 85 degrees C. or the temperature may be maintained at or below approximately 80 degrees C. during neutralisation, at or below approximately 60 degrees C. or at or below approximately 40 degrees C. In one embodiment, the neutralisation step is conducted at room or ambient temperature (for example, approximately 15 to approximately 30 degrees C., for example approximately 25 degrees C.).

Mixed metal solids may be recovered from a composition (for example the liquors PNL' and PML') using any appropriate methodology as will be understood in the art. The addition of magnesium hydroxide to the liquor and resultant pH will result in mixed metal oxides and/or hydroxides precipitating which can subsequently be separated as solids from the composition in which they remain. Separation of the precipitate may occur by any of a number of known methods. However, by way of example it may include filtration, centrifugation, sedimentation, and/or settling. In a preferred embodiment, filtration is used. In a preferred embodiment, a filter press or belt filtration is used.

After recovery, the mixed metal solids may be further processed using standard methods, having regard to its intended use. However, by way of example the mixed metal solids product may be washed and/or dried.

While the inventors have identified that the inclusion of a metals neutralisation step and the use of Ca(OH)2 in that step in a process of the invention (for example a process for recovering one or a combination of products from a titanium-bearing material or a composition produced in a process for the production of titanium dioxide) provides significant benefits over existing methods for the recovery of such products from these materials, they have determined that the use of Mg(OH)2 as the reagent in the metals neutralisation step provides previously unrecognised advantages. For example, the use of Mg(OH)2 has the advantage of avoiding or at least lowering the amount of red gypsum which may be produced and reports into the mixed metal solids product. In certain embodiments, iron hydroxide is a predominant component of the mixed metal solids. In one embodiment, the iron hydroxide may be separated from the other components in the mixed metal solids and sold as a separate product.

The inventors contemplate this embodiment of the invention being more suitable than the embodiment using Ca(OH)2 in cases where the titanium-bearing material, a composition produced in a process for the production of titanium dioxide, or any other composition described herein (for example, the fourth liquor (PNL) or the fifth liquor (PML)) comprises a relatively high or undesirable level of iron. The inventors contemplate that the embodiment using Ca(OH)2 may be more suitable where the titanium-bearing material, a composition produced in a process for the production of titanium dioxide, or any other composition described herein (for example, the fourth liquor (PNL) or the fifth liquor (PML)) comprises a relatively low or an acceptable level of iron.

Waste Water Treatment

The inventors contemplate that any waste water exiting a process of the invention is of minimal environmental risk. However, it may optionally be subject to any number of known water treatment processes to minimise the risk of it being considered an environmental hazard. In one embodiment, waste water produced during a method of the invention, for example at one or more washing step, may be fed to a zero liquid discharge (ZLD) process to recycle the water back into the process. The waste water may be processed to remove any solutes that may be present. For example, the waste water may be processed via evaporation to produce water vapor and a solid residue. The water vapour may be captured and condensed and then recycled back into the process. The solid residue could be recovered and combined with the retentate comprising calcium sulfate and silica recovered from a leaching step of a method of the invention to form a combined product.

Recovery of Products from a Composition Produced in a Process for the Production of Titanium Dioxide The inventors have developed processes for recovering calcium sulfate, mixed metal solids and/or magnesium sulfate from a composition produced in a sulfate process for the production of titanium dioxide from titanium-bearing materials (such as those described herein before or any other titanium bearing material comprising titanium dioxide in any form, including ilmenite, for example). The process is surprisingly efficient at recovering metal values (calcium, mixed metals and/or magnesium) of relatively low concentration from such waste compositions in a form in which they are considered saleable products. Thus, the processes developed by the inventors have the benefit of improving the economics of or providing alternative revenue streams from traditional methods for recovering titanium dioxide from feedstocks. They also have the benefit of minimising waste that must be disposed of and so lowering the environmental impact of such processes.

In one aspect, the invention provides methods for recovering one or more of calcium sulfate, mixed metal solids and/or magnesium sulfate from a composition produced in a sulfate process for the production of titanium dioxide. In certain embodiments, a) calcium sulfate, b) calcium sulfate and mixed metal solids, c) calcium sulfate, mixed metal solids and magnesium sulfate, or d) calcium sulfate and magnesium sulfate are recovered from the methods. In certain embodiments, the calcium sulfate recovered may be used as an alternative gypsum source, for example, and the magnesium sulfate could be used in plant fertiliser applications, for example.

Skilled persons will readily appreciate methods for the production or recovery of titanium dioxide using a sulfate method. However, by way of example, a feedstock comprising titanium dioxide (for example comprising ilmenite or perovskite) is sulphated using sulfuric acid and solid and liquid phases are separated, in certain methods, following a leach step. The phase comprising sulphated titanium salts (for example, titanyl sulfate) is then subjected to a hydrolysis reaction to create hydrated titanium dioxide. The hydrated titanium dioxide is typically separated from other components in the composition in which it resides and then calcined to produce titanium dioxide. The methods described herein provided further detailed examples of methods for the production of titanium dioxide.

During such processes for the production of titanium dioxide, compositions may be produced—such as the composition left over after titanium dioxide is recovered. Skilled persons will readily appreciate other compositions produced in titanium dioxide production processes that may be used in the invention. In one embodiment, the composition derived from a sulfate method for the production or recovery of titanium dioxide may be any acidic composition produced or recovered in the sulfate method. In one embodiment, the composition comprises at least magnesium. In one embodiment, the composition also comprises iron and/or aluminium and/or titanium and/or calcium. The magnesium, iron, titanium and aluminium will typically be present in the form of sulphated salts, for example magnesium sulfate, iron sulfate, titanyl sulfate and aluminium sulfate. In a preferred embodiment, the composition is considered a waste product of a sulfate method for the production or recovery of titanium dioxide. In one embodiment, the composition is an acidic composition produced or recovered following hydrolysis and recovery of hydrated titanium dioxide during a sulfate method for the production of titanium dioxide. By way of example only, in the context of the other methods described herein, it may be a post hydrolysis liquor (PHL). In another embodiment, the composition is an acidic composition produced or recovered following recovery of aluminium in a sulfate method for the production of titanium dioxide. In one embodiment, the composition is an acidic composition produced or recovered following hydrolysis and recovery of hydrated titanium dioxide and recovery of aluminium in a sulfate method for the production of titanium dioxide. By way of further example, separation of titanium dioxide hydrate in step e) of the first aspect of the invention results in a second liquor (PHL) and separation of titanium dioxide hydrate in step f) of the second aspect of the invention results in a third liquor (PAL), and each of these liquors may be used as the starting composition for this aspect of the invention.

In one embodiment, the methods of this aspect of the invention comprise at least the step of adding calcium carbonate and the composition produced in a process for the production of titanium dioxide to produce a composition (A) which comprises calcium sulphate and one or more other metal sulfates (including magnesium sulfate). The calcium sulfate may then be separated from composition (A) to produce calcium sulfate and a second composition (B) comprising magnesium sulfate and one or more other metal sulfates. Where desired, the magnesium sulfate can then separated from composition (B) to produce magnesium sulfate and a third composition (C) comprising mixed metal sulfates. Calcium hydroxide or magnesium hydroxide may then be mixed with the third composition (C) to produce a fourth composition (D) comprising mixed metal oxides and/or hydroxides and calcium sulphate (in the case of the use of calcium hydroxide), or mixed metal oxides and/or hydroxides (in the case of the use of magnesium hydroxide). Then, where desired, the mixed metal oxides and/or hydroxides and calcium sulfate, or the mixed metal oxides and/or hydroxides may be separated from the fourth composition (D).

In an alternative embodiment, which is preferred, mixed metal solids are recovered prior to recovery of magnesium sulfate. Using this order can improve the purity of magnesium sulfate recovered. In this embodiment, the methods comprise the step of adding calcium carbonate to the composition produced in a sulfate process for the production titanium dioxide to produce a composition (A) which comprises calcium sulphate and one or more other metal sulfates (including magnesium sulfate). The calcium sulfate is then separated from composition (A) to produce calcium sulfate and a second composition (B) comprising magnesium sulfate and one or more other metal sulfates. Calcium hydroxide or magnesium hydroxide may then be mixed with the second composition (B) to produce a third composition (C') comprising mixed metal oxides and/or hydroxides and calcium sulphate (in the case of the use of calcium hydroxide), or mixed metal oxides and/or hydroxides (in the case of the use of magnesium hydroxide). Then, where desired, the mixed metal oxides and/or hydroxides and calcium sulfate, or the mixed metal oxides and/or hydroxides are separated from the third composition (C') to produce mixed metal solids comprising calcium sulfate, or mixed metal solids and a fourth composition (D') comprising magnesium sulfate. The magnesium sulfate may then be separated from the fourth composition (D') to produce magnesium sulfate. A method according to this embodiment of the invention is shown in FIG. 3 (Option 2).

In one embodiment of this aspect of the invention, in the first step of combining calcium carbonate and the composition the conditions are such so that titanium will be in the $Ti^{4+}$ state and iron will be in the $Fe^{2+}$ state resulting in the production of a composition (A) comprising calcium sulfate, and one or more titanium oxides and/or hydroxides. In a preferred embodiment, controlling the conditions in this way composition (A) will comprise one or more aluminium oxides and/or hydroxides. In this embodiment, the next step may comprise separating calcium sulfate, and one or more aluminium and/or titanium oxides and/or hydroxides from the composition (A) to produce calcium sulfate, and one or more aluminium and/or titanium oxides and/or hydroxides and a composition (B) comprising mixed metal sulfates, including magnesium sulfate. A preferred method according to this embodiment of the invention is shown in FIG. 3 (Option 1).

The steps of the methods of this aspect of the invention can be performed using the equivalent steps of a method of other aspects of the invention as herein before described and as exemplified in the Examples which follow. Where the methods are described herein with reference to specific liquors or compositions, it will be appreciated that those references can be substituted with reference to the relevant compositions of this aspect of the invention.

In certain embodiments of this aspect of the invention, the composition produced in a process for the production of titanium dioxide may be treated or processed prior to the first step of the method (ie combining the composition with calcium carbonate).

EXAMPLES

Example 1

This example describes one embodiment of a method of the invention, as depicted in FIG. 1. A slag is prepared by grinding to the desired particle size. Slag and sulfuric acid are fed to a continuous reactor adapted for continuous blending of the slag, sulfuric acid and sulphated cake formed. The slag and sulfuric acid are mixed and fed through the reactor at a rate sufficient to achieve sulfation of titanium, magnesium, aluminium, and calcium and other minority species present in the slag feedstock. A sulphated cake exits the reactor and is fed to a leaching step in which it is contacted with water or dilute acid to produce a solid and liquid phase which are separated, preferably by filtration. The solid phase is recovered as calcium sulfate and silica and the liquid leach liquor phase is fed to a titanium hydrolysis step. In the hydrolysis step, TiO2 nuclei are contacted with the liquid leach liquor in an appropriate vessel, at an appropriate temperature and for an appropriate time sufficient to hydrolyse titanyl sulphate to hydrated titanium dioxide. Hydrated titanium dioxide is then separated from the liquid phase in which it is contained, preferably by filtration. The hydrated titanium dioxide is then fed to a calcining step and the liquid phase (PHL) is fed to an aluminium sulphate recovery step. Calcining occurs in a calcining apparatus, at an appropriate temperature and for an appropriate time sufficient to result in TiO2. The TiO2 may be further processed to meet individual requirements for different industries; for example, to produce a pigment-grade TiO2 product. The liquid PHL phase is fed to an aluminium sulphate crystallisation step, preferably an evaporative crystallisation, to recover $Al_2(SO_4)_3 \cdot XH_2O$ (where X is approximately 14 to 18, preferably 18). The liquid phase (PAL) resulting from this step is then fed to a neutralisation step in which it is partially neutralised with $CaCO_3$ to produce a solid and a liquid phase. The solid and liquid phase (PNL) are separated, preferably by filtration, and the solid white $CaSO_4 \cdot 2H_2O$ gypsum product is recovered. The liquid PNL phase is fed to a further neutralisation step in which it is neutralised using $Ca(OH)_2$ to precipitate and recover metal oxides and/or hydroxides and calcium sulfate (MMS). The MMS are separated from the liquid phase (MRL), preferably by filtration. The liquid MRL phase is fed to a crystallisation step to produce $MgSO_4 \cdot 7H_2O$. $MgSO_4 \cdot 7H_2O$ is preferably crystallised by evaporative crystallisation. $MgSO_4 \cdot 7H_2O$ is then separated and recovered from the liquid phase in which it is present, preferably by filtration. The remaining liquid is then optionally treated using a water treatment process.

Example 2

Figure 2:
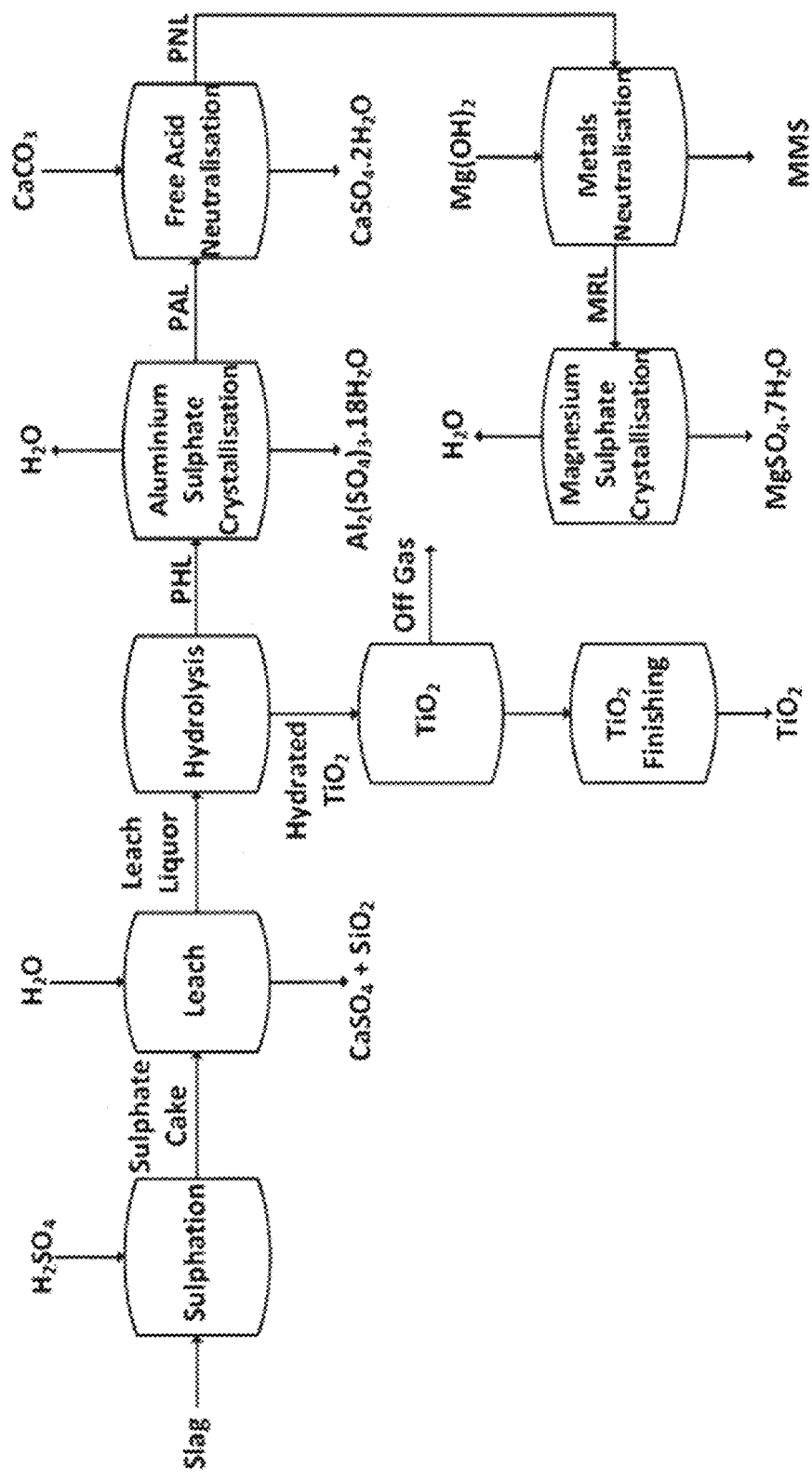
FIG. 2 show a process flow diagram depicting a preferred embodiment of the invention.

This example describes one embodiment of a preferred method of the invention, as depicted in FIG. 2. A slag is prepared by grinding to the desired particle size. Slag and sulfuric acid are fed to a continuous reactor adapted for continuous blending of the slag, sulfuric acid and sulphated cake formed. The slag and sulfuric acid are mixed and fed through the reactor at a rate sufficient to achieve sulfation of titanium, magnesium, aluminium, and calcium and other minority species present in the slag feedstock. A sulphated cake exits the reactor and is fed to a leaching step in which it is contacted with water or dilute acid to produce a solid and liquid phase which are separated, preferably by filtration.

The solid phase is recovered as calcium sulfate and silica and the liquid leach liquor phase is fed to a titanium hydrolysis step. In the hydrolysis step, TiO2 nuclei are contacted with the liquid leach liquor in an appropriate vessel, at an appropriate temperature and for an appropriate time sufficient to hydrolyse titanyl sulphate to hydrated titanium dioxide. Hydrated titanium dioxide is then separated from the liquid phase in which it is contained, preferably by filtration. The hydrated titanium dioxide is then fed to a calcining step and the liquid phase (PHL) is fed to an aluminium sulphate recovery step. Calcining occurs in a calcining apparatus, at an appropriate temperature and for an appropriate time sufficient to result in TiO2. The TiO2 may be further processed to meet individual requirements for different industries; for example, to produce a pigment-grade TiO2 product. The liquid PHL phase is fed to an aluminium sulphate crystallisation step, preferably an evaporative crystallisation, to recover $Al_2(SO_4)_3 \cdot XH_2O$ (where X is approximately 14 to 18, preferably 18). The liquid phase (PAL) resulting from this step is then fed to a neutralisation step in which it is partially neutralised with $CaCO_3$ to produce a solid and a liquid phase. The solid and liquid phase (PNL) are separated, preferably by filtration, and the solid white $CaSO_4 \cdot 2H_2O$ gypsum product is recovered. The liquid PNL phase is fed to a further neutralisation step in which it is neutralised using $Mg(OH)_2$ to precipitate and recover a mixture of metal oxides or hydroxides (MMS). The MMS are separated from the liquid phase (MRL), preferably by filtration. The liquid MRL phase is fed to a crystallisation step to produce $MgSO_4 \cdot 7H_2O$. $MgSO_4 \cdot 7H_2O$ is preferably crystallised by evaporative crystallisation. $MgSO_4 \cdot 7H_2O$ is then separated and recovered from the liquid phase in which it is present, preferably by filtration.

In the following examples, where any compound % in any composition/liquor is referred to, it has been calculated from the measured elemental % concentration using the following formula:

$$\frac{\% \text{ element measured}}{\text{atomic weight of element}} \times \text{molecular weight of assumed compound}$$

Example 3—New Zealand Steel Slag

Example 3A—Feedstock

The feedstock was a GAP 5 (<5 mm particle size) perovskite-containing VTM-slag originating from New Zealand Steel. The slag was ground to a target size of D90<250 microns and dried to free moisture level of <2% wt. The slag was analysed by XRF. Results of the levels of key elements are reported in Table 2.

TABLE 2

XRF analysis of New Zealand Steel slag

| Element | Symbol | NZS |
|---|---|---|
| Magnesium | Mg | 7.51% |
| Aluminium | Al | 8.10% |
| Silicon | Si | 6.71% |

TABLE 2-continued

XRF analysis of New Zealand Steel slag

| Element | Symbol | NZS |
|---|---|---|
| Sulphur | S | 0.269% |
| Calcium | Ca | 12.7% |
| Titanium | Ti | 19.7% |
| Vanadium | V | 0.177% |
| Chromium | Cr | 0.006% |
| Manganese | Mn | 0.777% |
| Iron | Fe | 3.22% |

Example 3B—Sulfation

Sulfuric acid with a concentration of 89% and NZS slag were mixed at ambient temperature in a pre-mix vessel in an acid to ore ratio of 1.4:1. The mixture was then added to a pre-heated reactor at 100° C., and the temperature was raised until the peak of the exotherm temperature of the reaction was reached and held for 1 h during which time the mixture was continuously blended. Once the sulphation was completed, the blended mixture (sulfate cake) was discharged out of the reactor and collected for addition to a leach tank.

Example 3C—Leach and Separation of Leach Liquor and Residue

Sulphate cake prepared according to the method described in Example 3B was recovered from a continuous reactor and transferred to a heated leach tank, where it was dissolved in dilute sulfuric acid at pH 2 in a mass ratio of liquid to cake of 1:1, followed by the addition of iron to reduce the Oxidation-Reduction Potential (ORP) in the liquor to −78 mV. The cake was leached for 60 minutes at 65° C. before filtering through a filter press for 30 minutes and subsequently a polishing filter to separate a residue from the leach liquor. The residue was subjected to a washing process and the leach liquor reported to a hydrolysis tank and was sampled for analysis via XRF and titrated to obtain free acidity.

The residue (CaISi) was washed with water in a 10:1 ratio of water to residue by slurrying for 30 minutes. The mixture was then filtered and the solid recovered and dried in at oven at 100° C. for 2 hours. The residue from separate sulfation reactions (conducted as described in example 3B) was pooled and analysed using XRF. Results of the levels of key elements are reported in Tables 3 and 4.

TABLE 3

Leach liquor XRF analysis

| TiO2* | 61.523 g/kg |
|---|---|
| Fe | 12.208 g/kg |
| Ca | 0.152 g/kg |
| Ti | 36.852 g/kg |
| Al | 14.772 g/kg |
| Mg | 15.212 g/kg |
| Mn | 1.604 g/kg |
| Cr | 0.088 g/kg |
| Free acidity | 8.18% |

*$TiO_2$ is calculated from elemental Ti.

TABLE 4

| CalSi XRF analysis (DS103) | |
| --- | --- |
| Fe | 0.916% |
| Ca | 15.15% |
| Si | 6.437% |
| Al | 4.234% |
| Mg | 3.947% |
| Mn | 0.330% |
| Cr | 0.017% |
| Ti | 5.215% |

Example 3D—TiO2 Hydrolysis, Separation and Calcining

A leach liquor obtained according to the method of example 3C was transferred to a hydrolysis tank maintained at 40° C., followed by the addition of 1.35% wt $TiO_2$ seeds/nuclei (6 nm). The mixture was then heated at approximately 1° C./min to reach a hydrolysis temperature of 92° C. at atmospheric pressure and held at temperature until the hydrolysis reaction was complete (i.e. the $TiO_2$ yield had plateaued, which was tested via sampling and XRF). The reacted mixture was then passed through a filter press to separate the $TiO_2$ cake from the spent hydrolysis liquor (SHL), and the SHL was analysed via XRF and titrated to determine free acidity. Results of the levels of key elements are reported in Table 5. The $TiO_2$ cake was washed with a warm 10% $H_2SO_4$ solution containing $Ti^{2+}$, followed by warm water to remove excess acid. The hydrated $TiO_2$ recovered from hydrolysis was doped by adding MgO, K2O, P2O5, heated at 900° C. in a rotary furnace for 1 h then milled to produce $TiO_2$. The calcined titanium dioxide was analysed and found to be of pigment grade. The $TiO_2$ seeds/nuclei used were produced using the Mecklenberg process.

TABLE 5

| Spent Hydrolysis liquor XRF analysis | |
| --- | --- |
| Mg | 19.056 g/kg |
| Mn | 1.576 g/kg |
| Al | 13.820 g/kg |
| Ca | 0.120 g/kg |
| Ti | 3.736 g/kg |
| Cr | 0.084 g/kg |
| Mn | 1.576 g/kg |
| Fe | 10.796 g/kg |
| Free Acidity | 14.4% |
| ORP | −85 mV |
| Density | 1.316 kg/ |

TABLE 5A

| NZS Hydrated $TiO_2$ XRF Analysis | |
| --- | --- |
| Mg | 0.032 cps |
| Al | 0.027 cps |
| Si | 0.001 cps |
| Ca | 0.003 cps |
| Mn | 0 cps |
| Ti | 99.633 cps |
| Cr/V | 0.002 cps |
| Fe | 0 cps | cps — counts per second

Chromium and vanadium are reported as a combined peak as the calibration used didn't have the capacity to distinguish between their emission peaks.

Example 3E—Aluminium Sulfate Recovery

A post hydrolysis liquor (PHL) prepared according to the method of example 3D was concentrated by evaporation until the aluminium sulphate in solution was soluble between 60-65° C. The liquor was then cooled to 3° C. below the aluminium sulphate solubility temperature and seeded with aluminium sulphate seeds originally crystallised from a pure aluminium sulphate and 25% sulphuric acid solution. Seeding was performed by adding 10% wt of the anticipated aluminium sulphate yield. The seeded liquor was then cooled at 4° C./hr over 8 h to 25° C. while maintaining a well agitated mixture. The slurry was then filtered via vacuum filtration to separate aluminium sulphate crystals from a post-aluminium liquor. Both the aluminium sulfate crystals and post-aluminium liquor were analysed via XRF. Results of the levels of key elements are reported in Tables 6 and 7. The aluminium sulfate was approximately 99% pure.

TABLE 6

| XRF results of Aluminium sulfate crystals | |
| --- | --- |
| Al | 72811 mg/kg |
| Ca | 115 mg/kg |
| Cr | 28 mg/kg |
| Fe | 115 mg/kg |
| Mg | 671 mg/kg |
| Mn | 6 mg/kg |
| Ti | 43 mg/kg |
| V | 22 mg/kg |

TABLE 7

| XRF analysis of Post Aluminium Liquor | |
| --- | --- |
| Al | 6.29 g/kg |
| Ca | 0.08 g/kg |
| Cr | 0.12 g/kg |
| Fe | 14.23 g/kg |
| Mg | 19.52 g/kg |
| Mn | 2.26 g/kg |
| Ti | 4.04 g/kg |
| Free Acidity | 21.96% |

Example 3F—Free Acid Neutralisation and Calcium Sulfate Recovery

An aqueous slurry of $CaCO_3$ in a water to solid ratio of 1:1 was gradually added to a post aluminium liquor (PAL) prepared according to the method as described in example 3E and mixed over 12 hours at 25° C. to neutralise the free acid to pH 2. The residue and post-neutralisation liquor (PNL) were filtered, and the residue was slurried with water for 30 minutes, filtered, then plug washed with fresh water. The solid was collected and dried in an oven at 70° C. for 4 hours. The recovered solid was analysed via XRF and XRD, and the PNL was analysed via XRF. Results of the XRF levels of key elements in the solid and PNL are reported in Tables 8 and 9. The solid was shown to have ~99.99% Calcium Sulphate Dihydrate using XRD.

TABLE 8

N108 Post-Neutralisation Liquor XRF and pH analysis

| | |
|---|---|
| Mg | 15.736 g/Kg |
| Al | 7.528 g/Kg |
| S | 134.392 g/Kg |
| Ca | 0.528 g/Kg |
| Ti | 1.552 g/Kg |
| Cr | 0.084 g/Kg |
| Mn | 2.032 g/Kg |
| Fe | 11.18 g/Kg |
| pH | 1.23 |

TABLE 9

$CaSO_4 \cdot 2H_2O$ (solid) XRF analysis

| Compound | |
|---|---|
| Mg | 0.691% |
| Al | 0.44% |
| Si | 0.171% |
| S | 19.13% |
| Fe | below detection limit |
| Ca | 22.464% |
| Ti | 0.136% |
| Cr | below detection limit |

Example 3G—Free Acid Neutralisation and Calcium Sulfate Recovery with Ti and Al

An alternative method to that described in Example 3F was performed in which any Ti and Al which may remain in the PAL are recovered with calcium sulfate.

Stage 1: oxidation of titanium (III) to titanium (IV) (N122, N124). Air was bubbled through stirred PAL liquor at 45° C. until an ORP of 270 mV was achieved. The liquor was then removed from the bubbler and heated to 85° C., and aliquots of $CaCO_3$ slurry in water were added to achieve a pH of 4. The mixture was then filtered via vacuum filtration to separate the solids from the liquor. The liquor was analysed via XRF and found to include no Ti or Al (Table 9A). These are expected to report to the solid phase.

TABLE 9A

N124 Post Neutralisation Liquor XRF analysis

| | |
|---|---|
| Mg | 16.684 g/kg |
| Al | 0 g/kg |
| Mn | 1.877 g/kg |
| Fe | 10.567 g/kg |
| Ca | 0.585 g/kg |
| Ti | below detection limit |
| Cr | below detection limit |
| pH | 4.01 |

Example 3H—Metals Neutralisation and Mixed Metal Solids Recovery Using Ca(OH)2

An aqueous slurry of $Ca(OH)_2$ in a water to solid ratio of 1.75:1 was gradually added to a PNL prepared according to the method described in example 3F and mixed over 12 hours at 25° C. to neutralise the free acid to pH 7.5. The residue and liquor were separated via vacuum filtration, and the filtrate was slurried with water for 30 minutes, filtered, then plug washed with fresh water. The solid was collected and dried in an oven at 70° C. for 4 hours then analysed via XRF. The separated liquor was also analysed via XRF. Results of the XRF levels of key elements in the solid and PNL are reported in Tables 10 and 11.

TABLE 10

Separated Liquor XRF analysis

| | |
|---|---|
| Mg | 13.028 g/kg |
| Al | 0.016 g/kg |
| S | 113.408 g/kg |
| Ca | 0.46 g/kg |
| Ti | below detection limit |
| Cr | 0.004 g/kg |
| Mn | 1.528 g/kg |
| Fe | 0.608 g/kg |
| pH | 6.14 |

TABLE 11

Mixed metal solids XRF analysis

| | |
|---|---|
| Mg | 1.092% |
| Al | 4.452% |
| Si | 0.693% |
| S | 16.209% |
| Ca | 16.701% |
| Ti | 2.122% |
| V | 0.18% |
| Cr | 0.026% |
| Mn | 0.384% |
| Fe | 6.018% |

Example 3I—Metals Neutralisation and Mixed Metal Solids Recovery Using Mg(OH)2

$Mg(OH)_2$ was added to a stirred Post Neutralisation Liquor obtained according to the method outlined in Example 3G until the pH was raised to 7. At this stage, air was bubbled through the solution over 8 h and additional $Mg(OH)_2$ was added to maintain pH at 7. Bubbling was continued over 12 h before filtering the mixture by vacuum filtration to separate the neutralised liquor from the solids. The solids were washed with RO water and placed in an oven at 70° C. for 12 h. The filtrate liquor was analysed via XRF. Results are shown in table 12.

TABLE 12

N112 Separated Liquor XRF Analysis

| | |
|---|---|
| Mg | 35.284 g/kg |
| Al | Below detection limit |
| S | 176.872 g/kg |
| Ca | 0.328 g/kg |
| Ti | 0.168 g/kg |
| Cr | Below detection limit |
| Mn | Below detection limit |
| Fe | Below detection limit |

The separated solids were not analysed. However, the inventors expect that approximately 90% or more of the trace elements in the liquor reported to this solid material.

Example 3J—Magnesium Sulfate Recovery

A liquor obtained from a method according to Example 3H was concentrated by evaporation at a constant rate at −90 kPa of vacuum in a vessel at 42° C. until a suitable magnesium sulfate yield was obtained, then the crystallised solids were separated from the liquor by filtration. Solids were washed with RO water before analysing via XRF. The solid was analysed by XRF and results are provided in Table 13.

TABLE 13

Magnesium Sulphate Crystals XRF Analysis

| | |
|---|---|
| Mg | 93.9335 g/kg |
| Al | 0.0044 g/kg |
| Ca | 0.1820 g/kg |
| Ti | 0.0009 g/kg |
| Cr | 0.0005 g/kg |
| Mn | 1.6634 g/kg |
| Fe | 0.1429 g/kg |
| V | 0.0009 g/kg |

These results show the recovery of high purity magnesium sulfate crystals with acceptable concentrations of Mn at <1% and Fe<2%. The magnesium sulfate recovered was at least approximately 95% pure.

Example 4

Examples of constituents contained in titanium-bearing materials of use in the invention are provided in Table 14. This provides details of the constituents of melter slag samples produced in New Zealand and South Africa and blast furnace slags produced in China and Russia. The Chinese slags were sourced from steel mills in China which process Panzhihua ore body located in the Sichuan region. It also details constituents of a perovskite-containing VTM ore concentrate samples obtained from Brazil. Values were calculated from elemental mass % data obtained using the X-ray fluorescence analytical technique (performed by or on behalf of the inventors) using the equation immediately preceding Example 3 herein before.

TABLE 14

| Calculated from elemental mass % | China 1 | China 2 | Russia | South Africa | NZ | China 3 | China 4 | Brazil |
|---|---|---|---|---|---|---|---|---|
| CaO % | 37.36 | 29.80 | 34.00 | 18.89 | 17.77 | 28.68 | 31.62 | 16.1-20.91 |
| TiO$_2$ % | 7.96 | 20.19 | 9.64 | 33.37 | 32.87 | 21.02 | 17.19 | 16.67-26.27 |
| SiO$_2$ % | 27.81 | 22.89 | 27.17 | 19.66 | 14.35 | 24.39 | 23.74 | 13.6-33.3 |
| MgO % | 7.99 | 7.91 | 12.01 | 8.56 | 12.45 | 7.50 | 8.04 | 2.30-2.84 |
| Al$_2$O$_3$ % | 12.32 | 13.43 | 12.68 | 13.42 | 15.31 | 12.45 | 11.62 | 5.72-7.41 |
| Fe$_2$O$_3$ % | 1.15 | 1.94 | 0.99 | 3.35 | 4.60 | 1.73 | 2.97 | 2.29-9.58 |
| V$_2$O$_5$ % | 0.13 | 0.37 | 0.28 | 0.71 | 0.32 | 0.30 | 0.23 | 0.21-0.32 |
| Ratio TiO$_2$/CaO | 0.21 | 0.68 | 0.28 | 1.77 | 1.85 | 0.73 | 0.54 | 1.03-1.31 |
| Ratio of TiO$_2$/MgO | 1.00 | 2.55 | 0.80 | 3.90 | 2.64 | 2.80 | 2.14 | 7.24-9.40 |
| Ratio of TiO$_2$/Al$_2$O$_3$ | 0.65 | 1.50 | 0.76 | 2.49 | 2.15 | 1.69 | 1.48 | 2.25-4.45 |

*Assumed compounds present reported. Metals could be present in one or more other oxide form.

Example 5—Chinese VTM-Slag

Slag

A perovskite-containing VTM slag is sourced from a steel mill in China which processes Panzhihua ore body located in the Sichuan region of China and is ground to target an overall desired grind size of D90<250 microns. Ground slag is dried to a desired level, for example, a free moisture content of <2% wt.

Sulfation

Sulfuric acid at a concentration of from approximately 80 to approximately 90% and slag are mixed at ambient temperature in an acid to ore ratio of from approximately 1.3:1 to approximately 1.7:1. The mixture is then added to a pre-heated reactor at 100° C. and the temperature raised to a bake temperature of from approximately 170 to approximately 210° C. and then held for 1 h during which time the mixture was continuously blended. Once the sulphation is complete, the blended mixture (sulfate cake) is discharged out of the reactor and collected for addition to a leach tank.

Leach and Separation of Leach Liquor and Residue

Sulphate cake is recovered from a continuous reactor and transferred to a heated leach vessel, where it is dissolved in dilute sulfuric acid at pH 2 in a mass ratio of liquid to cake of from approximately 0.75:1 to approximately 2:1. A reducing agent is then added, where necessary, to reduce the ORP to approximately −50 mV or less. Sulphuric acid is added to the mixture to reduce the pH to 2 (0.1% wt H$_2$SO$_4$) to avoid premature hydrolysis. The cake is leached for approximately 60 minutes at approximately 30° C. to 80° C., for example and then filtered through a filter cloth using vacuum filtration until a clear liquid is obtained. Residue left after filtering may be subjected to a washing process. Leach liquor obtained may be filtered.

The majority of calcium and silica present in the sulfate cake will report to the residue, in the form of calcium sulfate and silica. Titanyl sulfate, and any other metal sulfates, including aluminium sulfate and magnesium sulfate will report to the leach liquor.

TiO$_2$ Hydrolysis, Separation and Calcining

The leach liquor is transferred to a hydrolysis tank maintained for example at 40° C., followed by the addition of TiO$_2$ seeds/nuclei. The mixture is then heated to reach a desired hydrolysis temperature, for example from 85° C. to 110° C. at atmospheric pressure and held at temperature until the hydrolysis reaction is complete. The reacted mixture is then passed through a filter press to separate the TiO$_2$ cake from the post hydrolysis liquor (PHL). The TiO$_2$ cake is washed with a warm dilute (eg 10%) H$_2$SO4 solution containing Ti$^{3+}$, followed by warm water to remove excess acid. Hydrated TiO$_2$ recovered from hydrolysis is doped by adding MgO, K2O, P2O5, and then heated at 900° C. in a rotary furnace for 1 h. It may then be milled.

Aluminium Sulfate Recovery

PHL is concentrated by evaporation until the aluminium sulphate in solution is soluble between 60-65° C. The liquor is then cooled to 5° C. below the aluminium sulphate solubility temperature and seeded with aluminium sulphate seeds. Seeding is performed by adding 2 to 20% wt of the anticipated aluminium sulphate yield. The seeded liquor is cooled at approximately 4° C./hr to a temperature of between 15° C. to 30° C. while maintaining a well agitated mixture. The resulting slurry is filtered via vacuum filtration to separate aluminium sulphate crystals from a liquor. The aluminium sulfate is expected to be approximately at least approximately 95% pure.

Free Acid Neutralisation and Calcium Sulfate Recovery

An aqueous slurry of $CaCO_3$ in a water to solid ratio of 1:1 is gradually added to the liquor obtained from a the aluminium sulfate recovery process and mixed over 12 hours at 25° C. to neutralise the free acid to a pH of from 1 to 4. The residue and post-neutralisation liquor (PNL) is filtered, and the filtrate is slurried with water for 30 minutes in a 1:1 ratio of 10% $H_2SO_4$ to residue and heated to 60° C. before filtering. The solid is washed with water, collected and dried in an oven at 70° C. for 4 hours. The solid is expected to comprise calcium sulfate.

Metals Neutralisation and Mixed Metal Solids Recovery $Mg(OH)_2$ is added to a stirred Liquor obtained from the free acid neutralisation step to raise the pH to a pH of from 7 to 10, while air is bubbled through the solution. The solution is stirred over 3 h during which time additional $Mg(OH)_2$ is added to maintain the pH at a pH of from 7 to 10. The end slurry is then filtered by vacuum filtration to separate the neutralised liquor from the solids. The solids may be washed and dried. The solids are expected to comprise mixed metal oxides and hydroxides.

Magnesium Sulfate Recovery

A liquor resulting from the metals neutralisation step is concentrated by evaporation at a constant rate at −90 kPa of vacuum in a vessel at a temperature of less than 50° C. until a suitable magnesium sulfate yield was obtained. Crystallised solids are separated from the liquor by filtration. Solids may be washed. The purity of the magnesium sulfate crystals is expected to be at least approximately 95% and include very low levels of Mn and Fe (for example, Mn at <1% and Fe<2%).

The invention has been described herein with reference to certain preferred embodiments, in order to enable the reader to practice the invention without undue experimentation. Those skilled in the art will appreciate that the invention can be practiced in a large number of variations and modifications other than those specifically described. It is to be understood that the invention includes all such variations and modifications. Furthermore, titles, headings, or the like are provided to aid the reader's comprehension of this document and should not be read as limiting the scope of the present invention.

The entire disclosures of all applications, patents and publications cited herein are herein incorporated by reference. However, the reference to any prior art in this specification is not, and should not be taken as, an acknowledgement or any form of suggestion that that prior art forms part of the common general knowledge in the field of endeavour in any country.

The invention claimed is:

1. A method for the recovery of one or more product from a titanium-bearing material comprising perovskite, the method comprising:
   a) contacting the titanium-bearing material with sulfuric acid to form a cake comprising at least titanyl sulfate
   b) contacting the cake with water and/or dilute sulfuric acid to form a sulfated suspension comprising at least titanyl sulfate
   c) separating solids from liquid in the sulfated suspension to produce a first permeate (LL) comprising at least titanyl sulfate and a first retentate comprising at least calcium sulfate and silica; and,
   d) hydrolysing titanyl sulfate in the first permeate to produce a first liquor comprising titanium dioxide hydrate
   e) separating titanium dioxide hydrate from the first liquor to produce titanium dioxide hydrate and a second liquor (PHL) comprising at least aluminium sulfate
   f) separating aluminium sulfate from the second liquor (PHL) to produce aluminium sulfate and a third liquor (PAL) comprising mixed metal sulfates;
   or,
   d') separating aluminium sulfate from the first permeate (LL) to produce aluminium sulfate and a first liquor comprising at least titanyl sulfate
   e') hydrolysing titanyl sulfate in the first liquor to produce a second liquor (PHL) comprising titanium dioxide hydrate
   f') separating titanium dioxide hydrate from the second liquor (PHL) to produce titanium dioxide hydrate and a third liquor (PAL) comprising mixed metal sulfates, wherein either steps d), e), and f) or steps d'), e'), and f') are performed wherein the titanium-bearing material is contacted with sulfuric acid in a mass ratio from approximately 0.75:1 to approximately 2:1.

2. A method as claimed in claim 1, further comprising the step of:
   g) combining calcium carbonate and the third liquor to produce a first composition which comprises mixed metal sulfates comprising calcium sulfate.

3. A method as claimed in claim 2, the method further comprising the step of:
   h) separating calcium sulfate from the first composition to produce calcium sulfate and a fourth liquor comprising mixed metal sulfates.

4. A method as claimed in claim 3 further comprising the step of:
   i) separating magnesium sulfate from the fourth liquor to produce magnesium sulfate and a fifth liquor (PML) comprising mixed metal sulfates.

5. A method as claimed in claim 4, further comprising the step of:
   j) combining calcium hydroxide and the fifth liquor to produce a second composition which comprises mixed metal hydroxides and/or oxides and calcium sulfate, or combining magnesium hydroxide and the fifth liquor to produce a second composition which comprises mixed metal hydroxides and/or oxides.

6. A method as claimed in claim 5, the method further comprising the step of:
   k) Recovering the mixed metal oxides and/or hydroxides or the mixed metal oxides and/or hydroxides and calcium sulfate from the second composition to produce mixed metal solids.

7. A method as claimed in claim 3, the method further comprising the step of:
   i) combining calcium hydroxide and the fourth liquor to produce a second composition comprising mixed metal oxides and/or hydroxides, calcium sulfate and magnesium sulfate or combining magnesium hydroxide and the fourth liquor to produce a second composition comprising mixed metal oxides and/or hydroxides and magnesium sulfate.

8. A method as claimed in claim 7, the method further comprising the step of:
   j) separating the mixed metal oxides and/or hydroxides or the mixed metal oxides and/or hydroxides and calcium sulfate from the second composition to produce mixed metal solids or mixed metal solids and calcium sulfate and a fifth liquor comprising magnesium sulfate.

9. A method as claimed in claim 8, the method further comprising the step of:
k) Recovering magnesium sulfate from the fifth liquor to produce magnesium sulfate.

10. A method as claimed in claim 2, wherein the conditions at step g) are such so that titanium is in the form of $Ti^{4+}$ and iron is in the form of $Fe^{2+}$ to produce a first composition comprising calcium sulfate and one or more titanium oxides and/or hydroxides and then optionally separating calcium sulfate and one or more titanium oxides and/or hydroxides from the first composition to produce calcium sulfate and one or more titanium oxides and/or hydroxides and a fourth liquor comprising mixed metal sulfates.

11. A method as claimed in claim 1, wherein the method further comprises the step of calcining the hydrated titanium dioxide to produce titanium dioxide.

12. A method as claimed in claim 1, wherein the titanium-bearing material is chosen from the group comprising: an iron making slag, melter slag, blast furnace slag, a vanadium titano-magnetite ore, a vanadium titano-magnetite slag or combinations of two or more thereof.

13. A method as claimed in claim 1, wherein step a) is conducted so that the combined titanium-bearing material and sulfuric acid reaches a temperature of from approximately 130 degrees C. to approximately 250 degrees C.

14. A method as claimed in claim 1, wherein the concentration of sulfuric acid used is from at least approximately 60%.

15. A method as claimed in claim 1, wherein step a) is conducted for a period of from approximately 30 minutes to approximately 4 hours.

16. A method for the recovery of one or more products from a composition derived from a sulfate process for the production of titanium dioxide, the method comprising at least the steps of:
a) combining calcium carbonate and the composition to produce a composition (A) which comprises calcium sulfate; and,
b) separating calcium sulfate from the second composition (A) to produce calcium sulfate and a composition (B) comprising mixed metal sulfates comprising magnesium sulfate,
wherein calcium carbonate is combined with the composition so that the pH is in the range of from approximately 1 to approximately 4, and wherein the Oxidation-Reduction Potential (ORP) is in the range of from approximately 200 mV to approximately 300 mV.

17. A method as claimed in claim 16, the method further comprising the step of:
b) separating magnesium sulfate from composition (B) to produce magnesium sulfate and a composition (C) comprising mixed metal sulfates.

18. A method as claimed in claim 17, the method further comprising the step of:
c) combining calcium hydroxide and the composition (C) to produce a composition (D) comprising mixed metal oxides and/or hydroxides and calcium sulfate; OR
d1) combining magnesium hydroxide with the composition (C) to produce a composition (D) comprising mixed metal oxides and/or hydroxides.

19. A method as claimed in claim 18, the method further comprising the step of:
d) recovering the mixed metal oxides and/or hydroxides and calcium sulfate, or the mixed metal oxides and/or hydroxides from the composition (D) to produce mixed metal solids or mixed metal solids comprising calcium sulfate.

20. A method as claimed in claim 16, the method further comprising the step of:
c) combining calcium hydroxide with the composition (B) to produce a composition (C') comprising magnesium sulfate, mixed metal oxides and/or hydroxides and calcium sulfate; OR
c1) combining magnesium hydroxide with the composition (B) to produce a composition (C') comprising magnesium sulfate and mixed metal oxides and/or hydroxides.

21. A method as claimed in claim 20, the method further comprising the step of:
d) separating the mixed metal oxides and/or hydroxides and calcium sulfate, or the mixed metal oxides and/or hydroxides from the composition (C') to produce mixed metal solids comprising calcium sulfate or mixed metal solids and a composition (D') comprising magnesium sulfate.

22. A method as claimed in claim 21, the method further comprising the step of:
e) recovering magnesium sulfate from composition (D') to produce magnesium sulfate.

23. A method as claimed in claim 16, wherein the conditions are such that titanium is in the form of $Ti^{4+}$ and iron is in the form of $Fe^{2+}$ to produce a composition (A) comprising calcium sulfate, and one or more titanium oxides and/or hydroxides.

24. A method as claimed in claim 23, wherein the method further comprises separating calcium sulfate and one or more titanium oxides and/or hydroxides from composition (A) to produce calcium sulfate and one or more titanium oxides and/or hydroxides and a composition (B) comprising mixed metal sulfates.

* * * * *

UNITED STATES PATENT AND TRADEMARK OFFICE
CERTIFICATE OF CORRECTION

PATENT NO. : 12,172,905 B2
APPLICATION NO. : 17/312938
DATED : December 24, 2024
INVENTOR(S) : Campbell Stuart McNicoll et al.

Page 1 of 1

It is certified that error appears in the above-identified patent and that said Letters Patent is hereby corrected as shown below:

In the Claims

1) Claim 17 at Column 52 on Line 3: please substitute c) for b)

2) Claim 18 at Column 52 on Line 8: please substitute d) for c)

3) Claim 19 at Column 52 on Line 16: please substitute e) for d)

Signed and Sealed this
First Day of April, 2025

Coke Morgan Stewart
*Acting Director of the United States Patent and Trademark Office*